US012368993B2

(12) United States Patent
Parthy et al.

(10) Patent No.: US 12,368,993 B2
(45) Date of Patent: Jul. 22, 2025

(54) APPLE DUAL CONCENTRIC SPHERICAL MICROPHONE ARRAY

(71) Applicant: APPLE INC., Cupertino, CA (US)

(72) Inventors: Abhaya Parthy, Redwood City, CA (US); Dipanjan Sen, Dublin (IE); Bonnie W. Tom, Scotts Valley, CA (US); Jonathan D. Sheaffer, San Jose, CA (US); Justin D. Crosby, Cupertino, CA (US); Symeon Delikaris Manias, Playa Vista, CA (US); Emily A. Wigley, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 241 days.

(21) Appl. No.: 18/200,262

(22) Filed: May 22, 2023

(65) Prior Publication Data

US 2023/0396921 A1 Dec. 7, 2023

Related U.S. Application Data

(60) Provisional application No. 63/365,848, filed on Jun. 3, 2022.

(51) Int. Cl.
*H04R 3/00* (2006.01)
*H04R 31/00* (2006.01)

(52) U.S. Cl.
CPC ............. *H04R 3/005* (2013.01); *H04R 31/00* (2013.01)

(58) Field of Classification Search
None
See application file for complete search history.

(56) References Cited

U.S. PATENT DOCUMENTS 4,570,746 A * 2/1986 Das ........................ H04R 1/086 381/359
6,041,127 A * 3/2000 Elko ...................... H04R 3/005 381/92

(Continued)

FOREIGN PATENT DOCUMENTS

EP 0869697 B1 9/2001
EP 2773131 B1 4/2020

OTHER PUBLICATIONS

Craig T. Jin, et al., "Design, Optimization and Evaluation of a Dual-Radius Spherical Microphone Array" IEEE/ACM Transactions on Audio, Speech, and Language Processing, vol. 22, No. 1, dated Jan. 2014 , Apple. Downloaded on Feb. 26, 2020 at 18:18:55 UTC from IEEE Xplore in 12 pages.

(Continued)

*Primary Examiner* — Paul W Huber
(74) *Attorney, Agent, or Firm* — Kilpatrick Townsend & Stockton LLP

(57) ABSTRACT

A multi-radius spherical microphone that includes an inner body defining an inner sphere having an inner radius from a center; a plurality of inner microphones coupled to the inner spherical body and defining an array of inner microphones; an outer body defining an dodecahedron, wherein the inner body and the outer body are concentric about the center; and a plurality of outer microphones coupled to the outer body at respective vertices of the dodecahedron and defining an array of outer microphones, wherein each of the plurality of outer microphones is positioned radially equidistant from the center.

17 Claims, 17 Drawing Sheets

(56) References Cited

U.S. PATENT DOCUMENTS

| | | | | |
|---|---|---|---|---|
| 7,599,248 | B2 * | 10/2009 | Williams | H04R 1/406<br>367/8 |
| 8,284,952 | B2 * | 10/2012 | Reining | H04R 5/027<br>381/94.1 |
| 8,406,436 | B2 | 3/2013 | Craven et al. | |
| 9,307,326 | B2 | 4/2016 | Elko | |
| 9,445,198 | B2 | 9/2016 | Elko et al. | |
| 9,936,291 | B2 | 4/2018 | Christoph | |
| 10,721,559 | B2 * | 7/2020 | Thomas | H04R 3/005 |
| 11,510,000 | B2 * | 11/2022 | Yazawa | H04R 5/027 |
| 11,812,226 | B2 * | 11/2023 | Sacha | H04R 25/554 |
| 2017/0070840 | A1 | 3/2017 | Kordon et al. | |
| 2021/0352402 | A1 * | 11/2021 | Yazawa | H04R 1/406 |

OTHER PUBLICATIONS

R. H. Hardin et al., “Spherical Designs” downloaded from http://neilsloane.com/sphdesigns on May 22, 2023 in 4 pages.
R. H. Hardin et al., “McLaren’s Improved Snub Cube and Other New Spherical Designs in Three Dimensions” Mathematical Sciences Research Center, AT&T Bell Laboratories, Discrete & Computational Geometry, Discrete Comput Geom 15:429-441 (1996) in 13 pages.

* cited by examiner

APPLE DUAL CONCENTRIC SPHERICAL MICROPHONE ARRAY

CROSS-REFERENCES TO RELATED APPLICATIONS

This application claims the benefit of U.S. Provisional Patent Application No. 63/365,848, filed Jun. 3, 2022, entitled "Apple Dual Concentric Spherical Microphone Array" which is incorporated by reference herein in its entirety and for all purposes.

BACKGROUND OF THE INVENTION

Development of audio recording devices which utilize an array of microphones, rather than a single microphone can provide benefits in creating panoramic sound scenes having improved spatial resolution, and thus improved audio-quality. Recordings from the array of microphones can be modeled and filtered with respect to each other to generate an improved audio recording.

Spherical positioning of microphones around a common center allows for improved analysis of sound fields in the spherical harmonic domain. However, the particular radius from the center to a given microphone provides differing bandwidth capabilities. In particular, smaller-radius microphone arrays generally have a bandwidth in a higher frequency range, whereas larger-radius microphone arrays generally have a bandwidth in a lower frequency range. In light of this, dual-radius microphone arrays having a small diameter array and a large diameter array have been used to capture a larger bandwidth.

However, some dual-radius microphone arrays known in the art include a complex framework for the outer radius to rigidly position the larger-radius microphones. The complex framework includes electronic and structural features that occupy relatively large portions of the virtual spherical shape. These features can interfere with the sound field as it passes through the outer radius to the inner radius, which in turn can cause disruptions to the audio recordings of the microphone array. For this reason and others, there is a need in the art for an improved dual-radius microphone. which reduces the size and complexity of structural and electronic elements to provide improved sound recording capabilities.

BRIEF SUMMARY OF THE INVENTION

Embodiments described herein pertain to a multi-radius spherical microphone array that includes at least first and second concentric spheres that support first and second microphone arrays, respectively. Embodiments have a high degree of spatial resolution over a wide frequency range enabling the multi-radius spherical microphones disclosed to be used for high-quality recording and broadcasting of sound scenes in 3D.

In some embodiments a multi-radius spherical microphone includes: an inner body defining an inner sphere having an inner radius from a center; a first plurality of microphones coupled to the inner spherical body and defining an array of inner body microphones; an outer body defining a regular dodecahedron, wherein the inner body and the outer body are concentric about the center; and a second plurality of microphones coupled to the outer body at respective vertices of the dodecahedron and defining an array of outer body microphones, wherein each microphone in the second plurality of microphones is positioned radially equidistant from the center.

In some embodiments a multi-radius spherical microphone includes: an inner spherical body having a rigid shell extending around a center of the spherical body and defining an interior cavity; a first array of microphones coupled to and evenly distributed across an outer surface of the inner spherical body; an outer body defining a regular dodecahedron surrounding and concentric with the inner spherical body, wherein the outer body comprises an open frame having thirty arms aligned along edges of the regular dodecahedron that connect with each other at vertices of the regular dodecahedron; and a second array of microphones coupled to the outer body at respective vertices of the regular dodecahedron.

In some embodiments a multi-radius spherical microphone includes: an inner spherical body having a rigid shell extending around a center of the spherical body and defining an interior cavity; a first array of forty-four microphones coupled to and evenly distributed across an outer surface of the inner spherical body; an outer body defining a regular dodecahedron surrounding and concentric with the inner spherical body, wherein the outer body includes an open frame having thirty arms aligned along edges of the regular dodecahedron that connect with each other at vertices of the regular dodecahedron; a second array of twenty microphones coupled to the outer body at respective vertices of the regular dodecahedron; and a mounting shaft coupled with the inner body and extending outwardly through the outer body.

In various implementations, a multi-radius spherical microphone array can further include one or more of the following. A mounting shaft coupled with the inner body and extending outwardly through the outer body. A plurality of support struts coupling the outer body to the mounting shaft. The multi-radius spherical microphone array can further include a sleeve positioned over a portion of a length of the hollow stem. A wind shield that fully surrounds the first and second pluralities of microphones.

In various implementations, embodiments can include one or more of the following features. The outer body can include a plurality of rigid arms that define thirty edges of the regular dodecahedron. The outer body can be a unitary structure. The outer body can be fabricated in a 3D printing process. The outer body can further include a plurality of joint structures, one at each of the vertices of the regular dodecahedron. Each of the plurality of rigid arms can be coupled between two separate joint structures in the plurality of joint structures. Each joint structure can include a surface for supporting one microphone in the array of outer body microphones. The mounting shaft can include a hollow stem extending along its length. The plurality of support struts can include a first plurality of struts extending between an upper portion of the sleeve and the outer body and a second plurality of struts extending between a lower portion of the sleeve and the outer body. Each microphone in the first plurality of microphones can be positioned radially equidistant from the center. The microphones in the array of inner body microphones can be evenly distributed across an outer surface of the inner spherical body. Each microphone in the first plurality of microphones can be a MEMS microphone that is part of a pair of MEMS microphones. Each microphone in the second plurality of microphones can be a MEMS microphone that is part of a pair of MEMS microphones. Each microphone in the first array of microphones can include a microphone port positioned at a surface of an idealized imaginary sphere representative of an inner sphere of the multi-radius spherical microphone array. Each microphone in the second array of microphones can include a microphone port positioned at a surface of an idealized imaginary sphere representative of an outer sphere of the multi-radius spherical microphone array. Each microphone in the first array of microphones can be coupled to a signal cable that extends out of the inner spherical body into the hollow shaft.

The following detailed description, together with the accompanying drawings, will provide a better understanding of the nature and advantages of the present invention.

DETAILED DESCRIPTION OF THE INVENTION

Embodiments described herein pertain to a multi-radius spherical microphone array (SMA) that includes at least first and second concentric spheres that support first and second microphone arrays, respectively and provide a high degree of spatial resolution over a wide frequency range. While the particular embodiments of a multi-radius SMA presented in the aforementioned figures include two spherical microphone array: an inner, central microphone spherical array and an outer microphone spherical array, it is to be understood that embodiments can also include spherical microphone arrays with three or more concentric spheres of microphones. Accordingly, while the following description focuses on specific examples of dual-microphone SMA, it should be understood that embodiments are not limited to the specific examples presented.

Dual-Radius Spherical Microphone Array

Figure 1A:
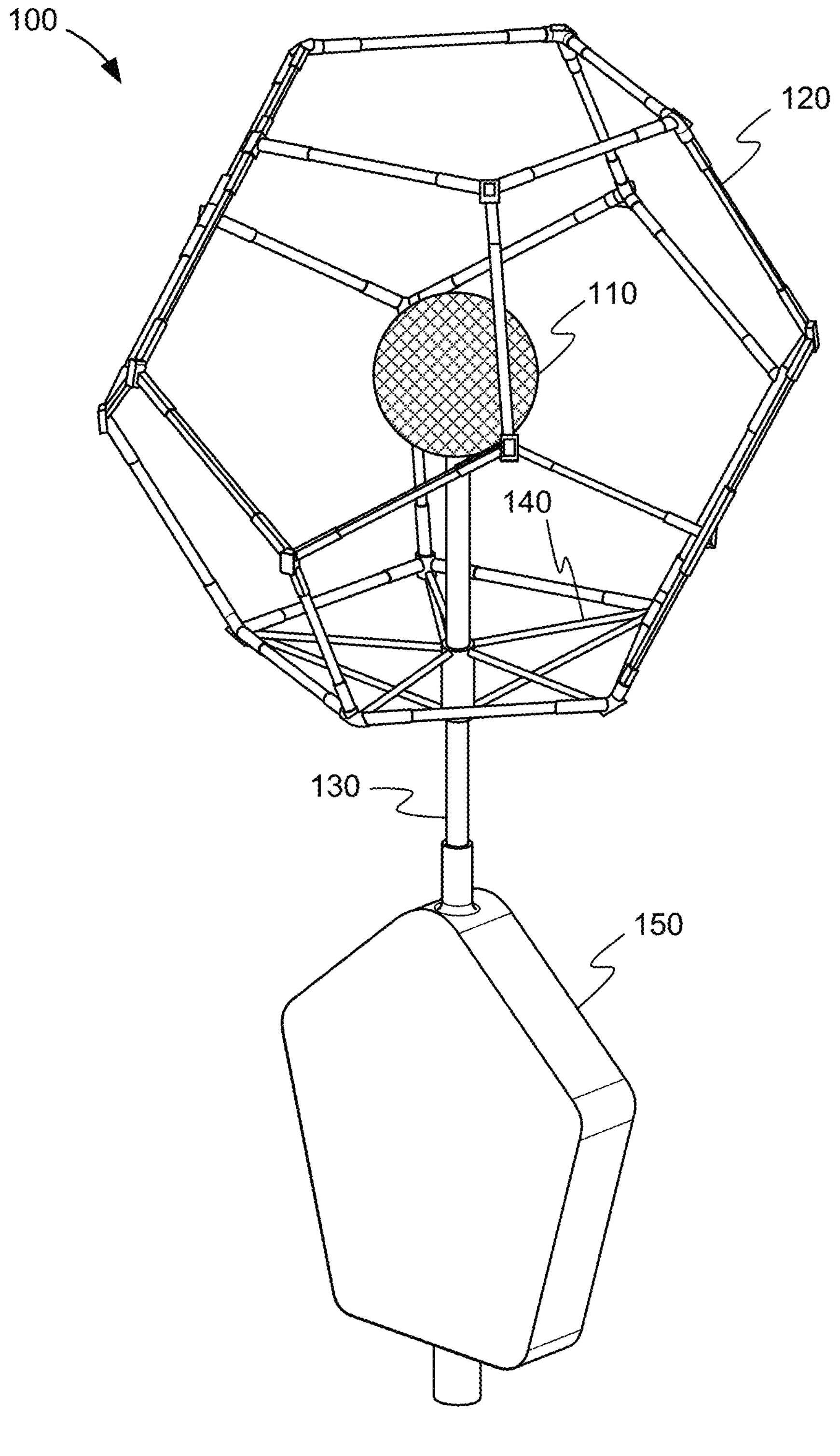
FIG. 1A is a simplified illustration of a dual-radius spherical microphone according to some embodiments.

In order to better understand and appreciate some embodiments of the present invention, reference is first made to FIG. 1A, which is a simplified illustration of a dual-radius spherical microphone array (SMA) 100 according to some embodiments that can capture sound fields with high spatial fidelity over a broad frequency range. Dual-radius SMA 100 includes two concentric spheres: an inner, central microphone sphere 110 (sometimes referred to herein as "inner sphere 110") and an outer microphone sphere 120 (sometimes referred to herein as "outer sphere 120"). Inner sphere 110 supports a first microphone array configured and optimized to capture high frequencies with low error due to spatial aliasing while outer sphere 120 supports a second microphone array configured and optimized to capture low frequencies with low error due to sensor self-noise. To meet these dual design goals, inner sphere 110 can have a relatively small radius and can support a first microphone array that includes a relatively large number of microphones to ensure a small distance between each microphone, while outer sphere 120 can support a second microphone array across a much larger radius that facilitates measuring sound fields over a large area. In one particular non-limiting implementation where dual-radius SMA 100 can capture sound within a frequency range of 50 Hz to 16 kHz (with a white noise gain >0 dB between 100 Hz and 16 kHz), inner sphere 110 supports forty-four MEMS microphones across an outer spherical surface that has a radius of 2.8 cm while outer sphere 120 supports twenty MEMS microphones at points along the sphere at a radius of 4.5 times that of the inner sphere or 12.6 cm.

In the depicted embodiment, inner sphere 110 can include a rigid outer shell that supports each of the microphones in the first microphone array. The microphones in the first array can be uniformly distributed across the exterior surface of inner sphere 110 in accordance with a spherical t-design arrangement as described in "Spherical Designs" by R. H. Harin and N. J. A. Slone (http://neilsloane.com/sphdesigns/), which is hereby incorporated by reference in its entirety.

Outer sphere 120 is an open structure that is designed to be transparent to the sound field. The outer sphere 120 includes a frame having a regular dodecahedron shape where each edge of the regular dodecahedron frame is formed by one of thirty separate arms that make up the frame. The arms meets at twenty different vertices distributed uniformly across an imaginary surface of the idealized outer sphere and a MEMS microphone is positioned at each of the twenty vertices. Thus, in the depicted embodiment, dual-radius SMA 100 includes sixty-four MEMS microphones that can work together to capture and record sound in a full 360 degree field surrounding dual-radius SMA 100. Further details of both inner sphere 110 and outer sphere 120 are discussed in conjunctions with additional figures below.

As shown, inner sphere 110 can be coupled to outer sphere 120 by a mounting shaft 130 and multiple support struts 140. Mounting shaft 130 extends through outer sphere 120 and can be directly mechanically attached to inner sphere 110. Support struts 140 can then extend from various arms of outer sphere 120 to mounting shaft 130 thereby securely attaching the outer sphere 120 to the mounting shaft providing a fixed relationship between the inner sphere 110 and the outer sphere 120.

In some embodiments, mounting shaft 130 can serve a dual purpose of routing signal cables from the MEMS microphones to a custom audio processing system that converts the sixty-four microphone signals to a High Order Ambisonics (HOA) signal (e.g., a $5^{th}$ order HOA signal in some embodiments). The HOA signal can then be used downstream by other systems to recreate the captured sound field. In the depicted embodiment, the audio processing system is enclosed within an audio processor housing 150 mechanically coupled to mounting shaft 130. The location, shape and design of audio processor housing 150 can differ from what is shown in various embodiments and in some embodiments the custom audio processing system can be located in a housing separate from dual-radius SMA 100 or can be performed by one or more audio processors that are part of a separate computer processor system.

Figure 1B:
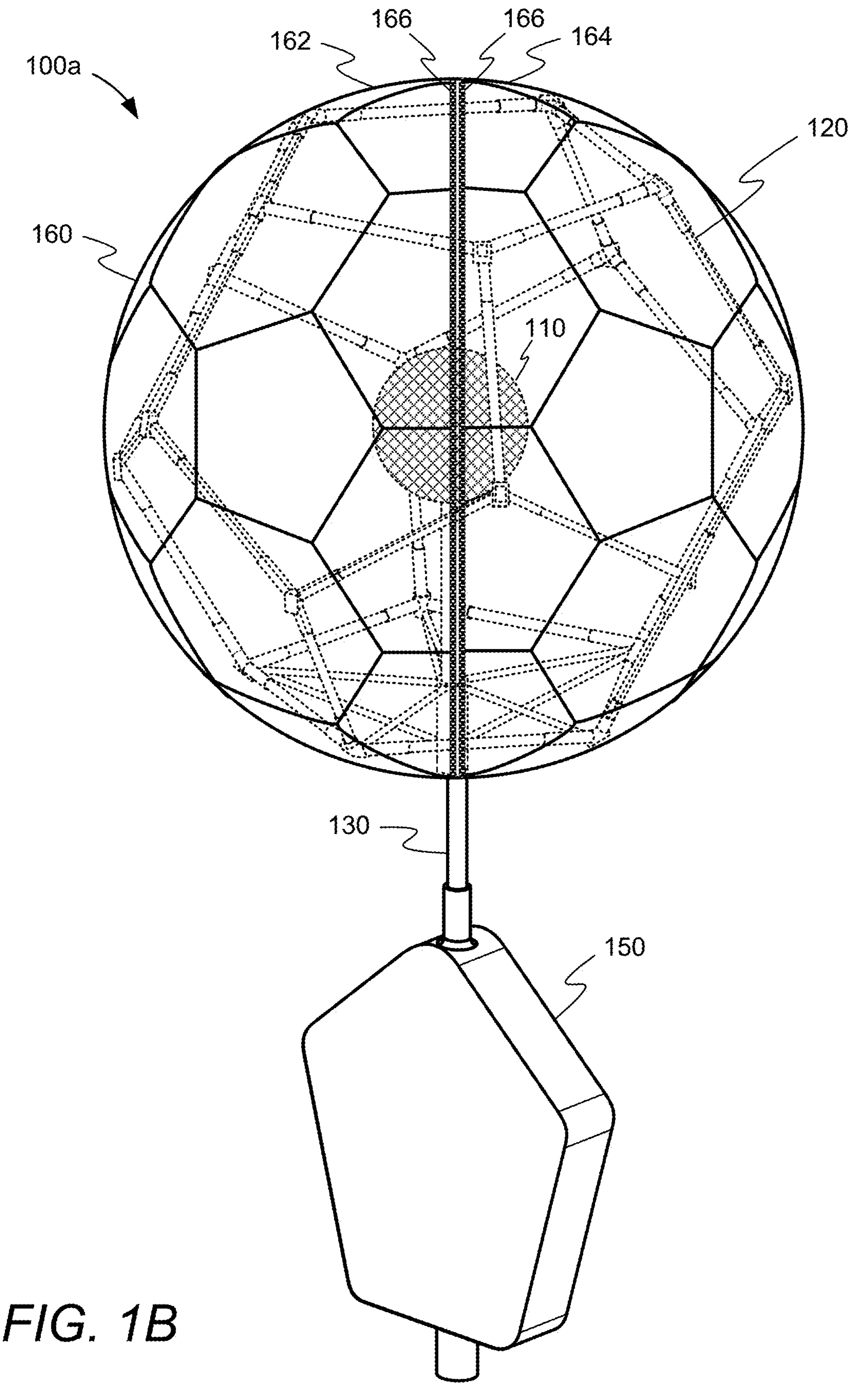
FIG. 1B is a simplified illustration of a dual-radius spherical microphone with a wind screen according to some embodiments.

Reference is now made to FIG. 1B, which is a simplified illustration of a dual-radius spherical microphone array 100*a* according to some embodiments. Dual-radius spherical microphone array 100*a* is similar to dual-radius spherical microphone array 100 except that microphone array 100*a* includes a wind shield 160 that reduces the effects of potential wind from impacting the microphones and causing unwanted noise. Wind shield 160 can be coupled to mounting shaft 130 and fully surround both the inner and outer microphone arrays 110, 120, respectively, which for convenience of illustration are shown in FIG. 1B with dashed lines.

A variety of different configurations for wind shield 160 can be employed as would be appreciated by a person of skill in the art. In the depicted embodiment, wind shield 160 is formed from two pieces 162, 164 (two hemispheres) that can be mirror images of each other. The two hemispheres can be abutted together along planar edges 166, 168 (i.e., the flat edge of each hemisphere) and locked together by magnets (not shown). Each of the hemispheres 162, 164 includes a rigid frame having arms linked together in a hexagonal pattern that provide structure for the hemisphere. The hexagonal pattern is arranged such that none of the arms cover or otherwise interfere with one of the microphones coupled to outer body 120. A fabric or similar soft, furry material can be extended across the arms to provide the desired wind blocking effect. While wind shield 160 can be fabricated using a variety of different techniques, in some embodiments each of the hemispheres 162, 164 are printed with a 3D printer.

Inner Microphone Array

Figure 2A:
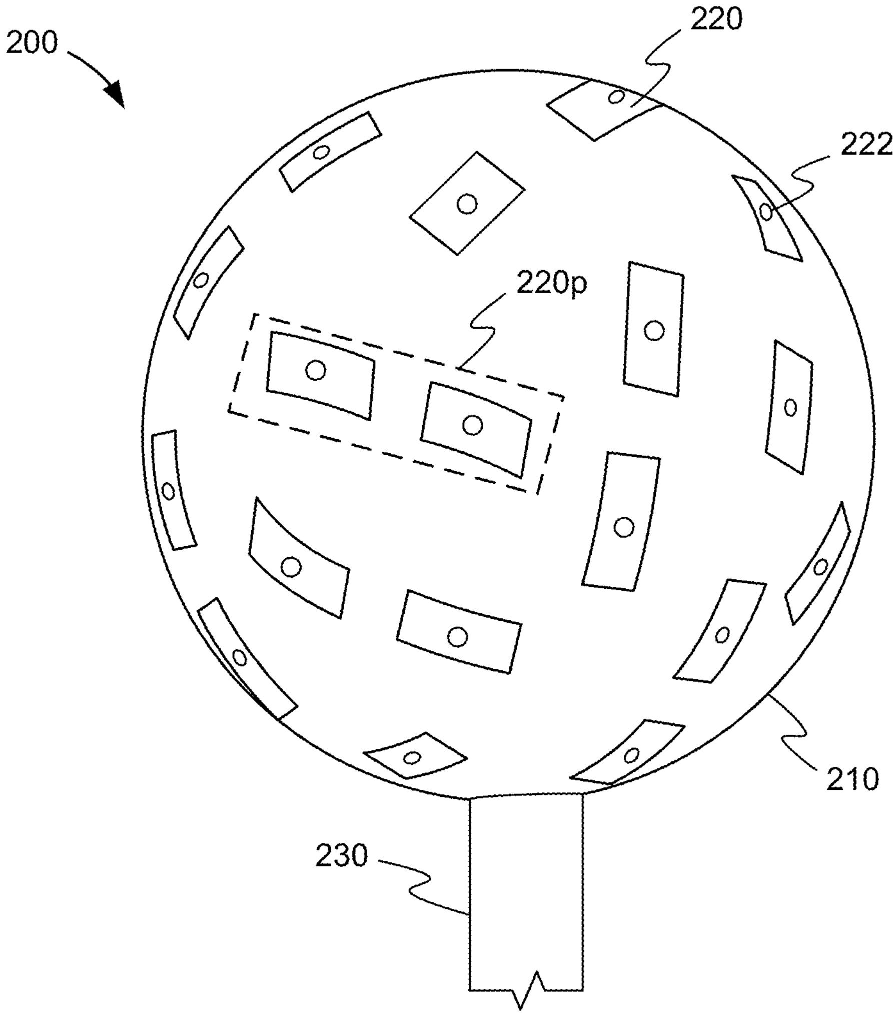
FIG. 2A is a simplified illustration of an inner spherical microphone body with an array of inner microphones distributed across its outer surface according to some embodiments.

FIG. 2A is a simplified illustration of an inner, central microphone sphere 200 (sometimes referred to herein as "inner sphere 200") according to some embodiments and can be representative of inner sphere 110 discussed above with respect to FIG. 1. Inner sphere 200 can include an inner sphere body 210 having a solid outer surface and a first array of microphones 220 uniformly distributed across outer surface 210. In some embodiments inner sphere body 210 can be made from a rigid and hard plastic or similar material in the form of a spherical shell that defines an interior cavity.

Figure 2B:
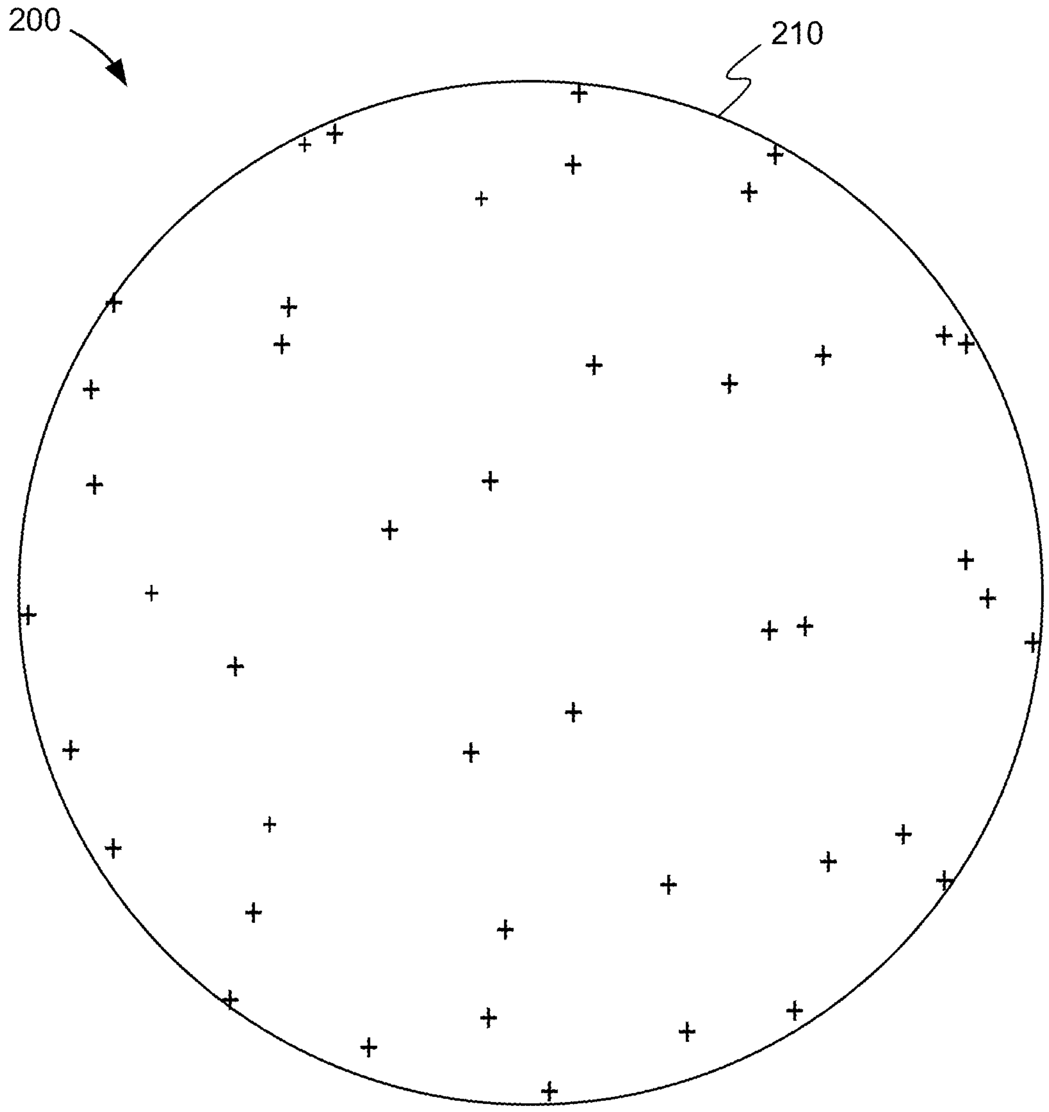
FIG. 2B is a simplified schematic diagram depicting an arrangement of microphones supported by an inner spherical microphone body according to some embodiments.

Cutouts can be formed across the surface of the spherical shell at every location at which a microphone 220 from the microphone array is positioned. Each microphone 220 can be mounted to an interior surface of inner sphere body 210 such that a portion of the microphone with a microphone port 222 extends through and fills its respective cutout and is generally flush with the exterior surface of inner sphere 220. The cutouts and microphones 220 can be positioned such that the port 222 of each microphone is on the surface of the idealized imaginary sphere that representative of inner sphere 200. To illustrate, reference is made to FIG. 2B, which is a simplified schematic diagram depicting an arrangement of microphones supported by an inner sphere body according to some embodiments. As shown, there are forty-four microphone ports (with each port represented by a "+" symbol) distributed across the surface of inner sphere body 210. Note that inner sphere body 210 is schematically represented in FIG. 2B as a transparent view such that some of the microphone ports depicted in FIG. 2B are on a back surface of the body 210 and would thus not be visible if the body 210 was made from opaque material.

Referring back to FIG. 2A, electrical connections to the microphones 220 can be made within the interior cavity of body 210 and signal wiring associated with the microphone array can extend within the interior cavity down to a mounting shaft 230. The mounting shaft 230 can be hollow enabling the signal wiring to be routed out of sight to processing circuitry as described below.

Figure 3A:
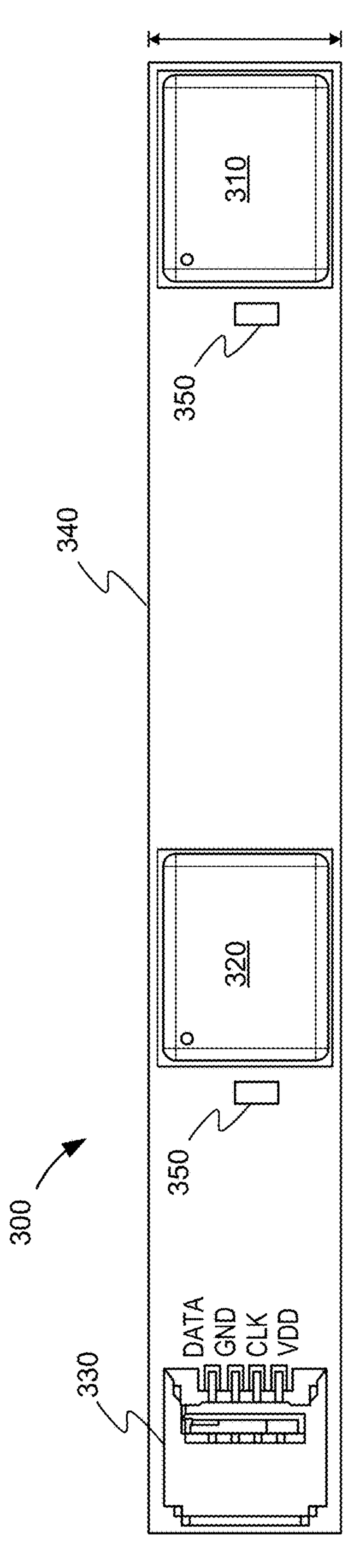
FIG. 3A is a simplified top plan view of a pair of MEMS microphones according to some embodiments that can be arranged along the inner spherical microphone body shown in FIG. 2.
Figure 3B:
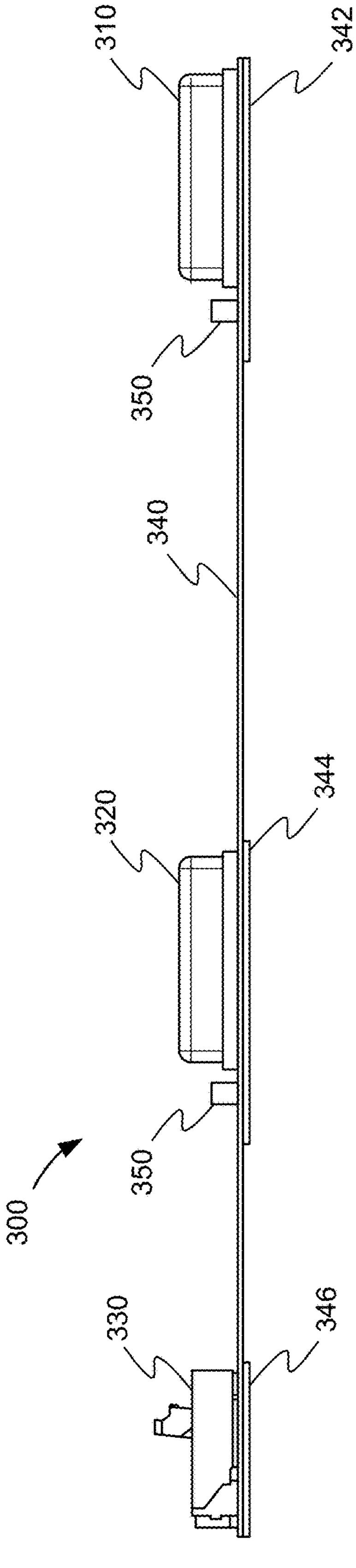
FIG. 3B is a simplified side view of the MEMS microphone pair depicted in FIG. 3A according to some embodiments.

In some embodiments, microphones 220 are MEMS microphones arranged in pairs 220*p*. The two microphones in each given microphone pair 220*p* can be connected together by a flex circuit that runs within the interior cavity defined by inner sphere body 210, for example, along an interior surface of the body. Further details on the microphone pairs and flex circuit are discussed below with respect to FIGS. 3A and 3B, where FIG. 3A is a simplified top plan view of a MEMS microphone pair 300 according to some embodiments and FIG. 3B is a simplified side view of the pair of MEMS microphones 300 depicted in FIG. 3A. MEMS microphone pair 300 can be representative of each and every 220*p* microphone pair mounted on inner sphere body 210. Thus, an embodiment that includes forty-four microphones distributed around a periphery of the inner sphere body 210 can include twenty two pairs of MEMS microphones 300.

Microphone pair 300 includes a first MEMS microphone 310, a second MEMS microphone 320, and a connector 330.

Each of the MEMS microphones 310, 320 and the connector 330 are mounted on a flex cable 340 that both supports and provides electrical interconnects to and from the components 310, 320 and 330. For example, flex cable 340 includes traces that can route various electrical signals including, for example, a voltage signal ($V_{DD}$), a Clock signal (CLK), a Data signal and Ground signal (GND), between connector 330 and each of the two microphones 310, 320. Additionally, in some embodiments one or more discrete components 350 that function as filter to guarantee signal integrity can be operatively coupled to each MEMS microphone 310, 320. Some MEMS microphones can include such filters internally and thus would not benefit from discrete components 350.

In some embodiments, stiffeners 342, 344 and 346 can be attached to an underside of flex cable 340 to provide additional support for the mounted components. Flex cable 340 and each of the stiffeners 342 and 344 can have holes formed through them (not visible in FIGS. 3A or 3B) that are aligned with the microphone port 222 (shown in FIG. 2A) of each microphone to allow sound to reach the respective microphone. Additionally, in some embodiments, an acoustic mesh is disposed over the microphone port in each of microphones 310, 320. The acoustic mesh can be a fabric that protects against dust and debris from entering the microphone port and/or an acoustic membrane that protects against the ingress of moisture.

Each stiffener can be a thin (e.g., between 100-200 microns in some embodiments) rigid structure, rectangular in shape that has a footprint that is slightly larger than the component it supports. For example, stiffeners 342 and 344 can be slightly larger than the footprint of microphones 310 and 320, respectively, while stiffener 346 can be slightly larger than the footprint of connector 330. Stiffeners 342 and 344 can be sized and shaped to match the size and shape of the cutouts formed in body 210 such that the stiffeners 342, 244 fit within respective cutouts and are generally flush with the outer surface of body 210 as shown in FIGS. 4A and 4B discussed below.

Connector 330 provides an interface to the MEMS microphone pair 300 enabling transmission of the various electrical signals (e.g., $V_{DD}$, CLK, Data and GND signals) over one or more signal wires that connect the microphones to a power supply and audio processing circuitry. To provide an idea on the scale of some embodiments, in one implementation where MEMS microphone pair 300 is representative of each of the microphone pairs in a dual-radius SMA in which the inner sphere has a radius of 2.8 cm, flex circuit 340 can be about 34 mm long.

Figure 4A:
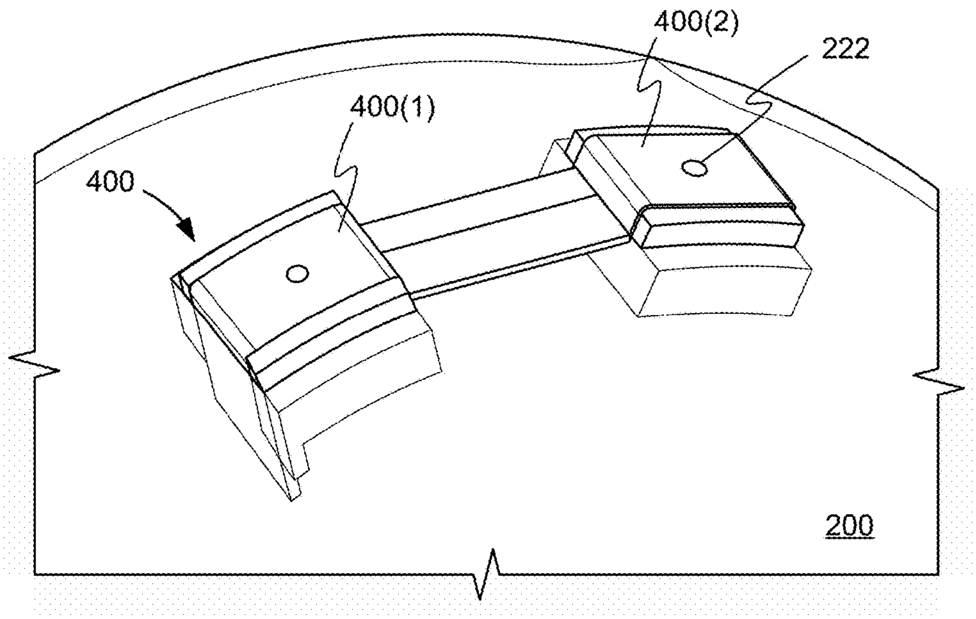
FIG. 4A is a simplified perspective view of a pair of MEMS microphones positioned along a portion of an inner spherical microphone body according to some embodiments.
Figure 4B:
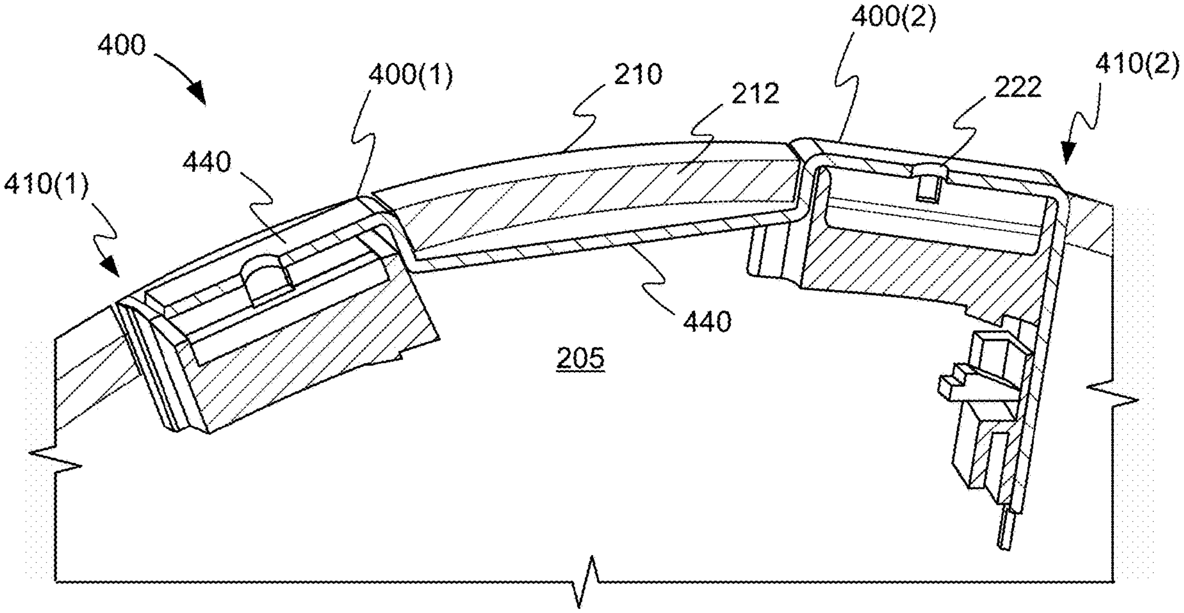
FIG. 4B is a simplified cross-sectional view of the pair of MEMS microphones depicted in FIG. 4A according to some embodiments.

Reference is now made to FIGS. 4A and 4B where FIG. 4A is a simplified perspective view of a microphone pair 400 that is representative of microphone pair 300 and depicted in FIGS. 4A, 4B positioned along a portion of an inner sphere 200 according to some embodiments and FIG. 4B is a simplified cross-sectional view of the microphone pair 400 positioned within the inner sphere 200. As shown, microphone pair 400 includes first and second microphones 400(1), 400(2) each of which can be fit within a respective cutout 410(1), 410(2) made through a peripheral wall 212 of inner sphere body 210 as discussed above. For example, microphone pair 400 can be aligned such that an end microphone 410(1) (representative of microphones 310) fits within cutout 410(1) with a portion of a flex circuit 440 at the outer surface of inner sphere 200. Flex circuit 440 bends around an inner edge of wall 212 into the interior cavity 205 of inner sphere 200 before bending back around an inner edge of wall 212 into cutout 410(2). As depicted in FIG. 4B, each of microphones 400(1), 400(2) fit closely within their respective openings 410(1), 410(2) with a portion of each microphone constituting part of the exterior surface of inner sphere body 210.

FIGS. 4A and 4B depict an embodiment in which microphone pair 400 is a pair of bottom port MEMS microphones. In some embodiments, top port MEMS microphones can be used instead in which case the flex does not extend along an outer surface of inner sphere 400 and instead can be underneath the MEMS microphones extending along a portion of the interior of the inner sphere.

Figure 5A:
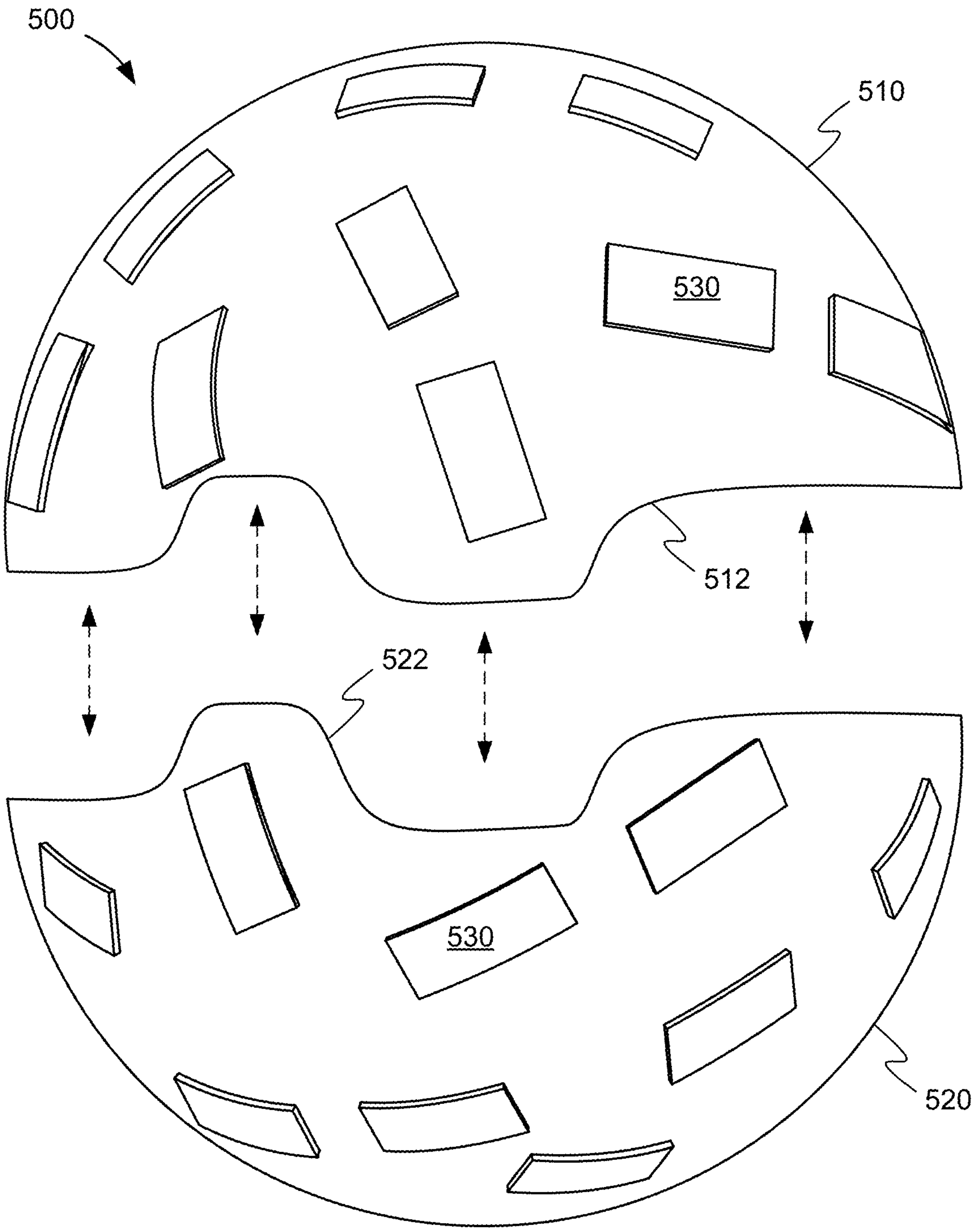
FIG. 5A is a simplified illustration of first and second halves of an inner spherical microphone body according to some embodiments.

As discussed above, microphones 220 can be distributed uniformly across the exterior surface of inner sphere body 210. In the depicted embodiment, there are forty-four separate microphones 220. In some embodiments, inner sphere body 210 can be advantageously formed from two separate pieces (i.e., "halves") as shown in FIG. 5A, which is a simplified illustration of an inner spherical microphone body 500 according to some embodiments. Inner sphere body 500 includes a first body half 510 that has a bottom edge 512 and a second body half 520 that has an upper edge 522. Forming body 500 with multiple separate pieces provides clearance (e.g., for appropriate tools) that enables the microphones (not shown in FIG. 5A) to be more easily secured to body 500.

Each of the first and second body halves 510, 520 can be formed by an exterior wall that includes multiple cutouts 530 formed there through for each microphone as discussed above. Body halves 510, 520 can be joined together at edges 512, 522 by any appropriate means (e.g., chemical bonding, adhesive, etc.). In order for the edges 512, 522 of the body halves 510, 520, respectively, to not pass through any of the microphone cutouts, edges 512 and 522 can have complementary irregular shaped paths snake around and do not extend through any of the cutouts.

Figure 5B:
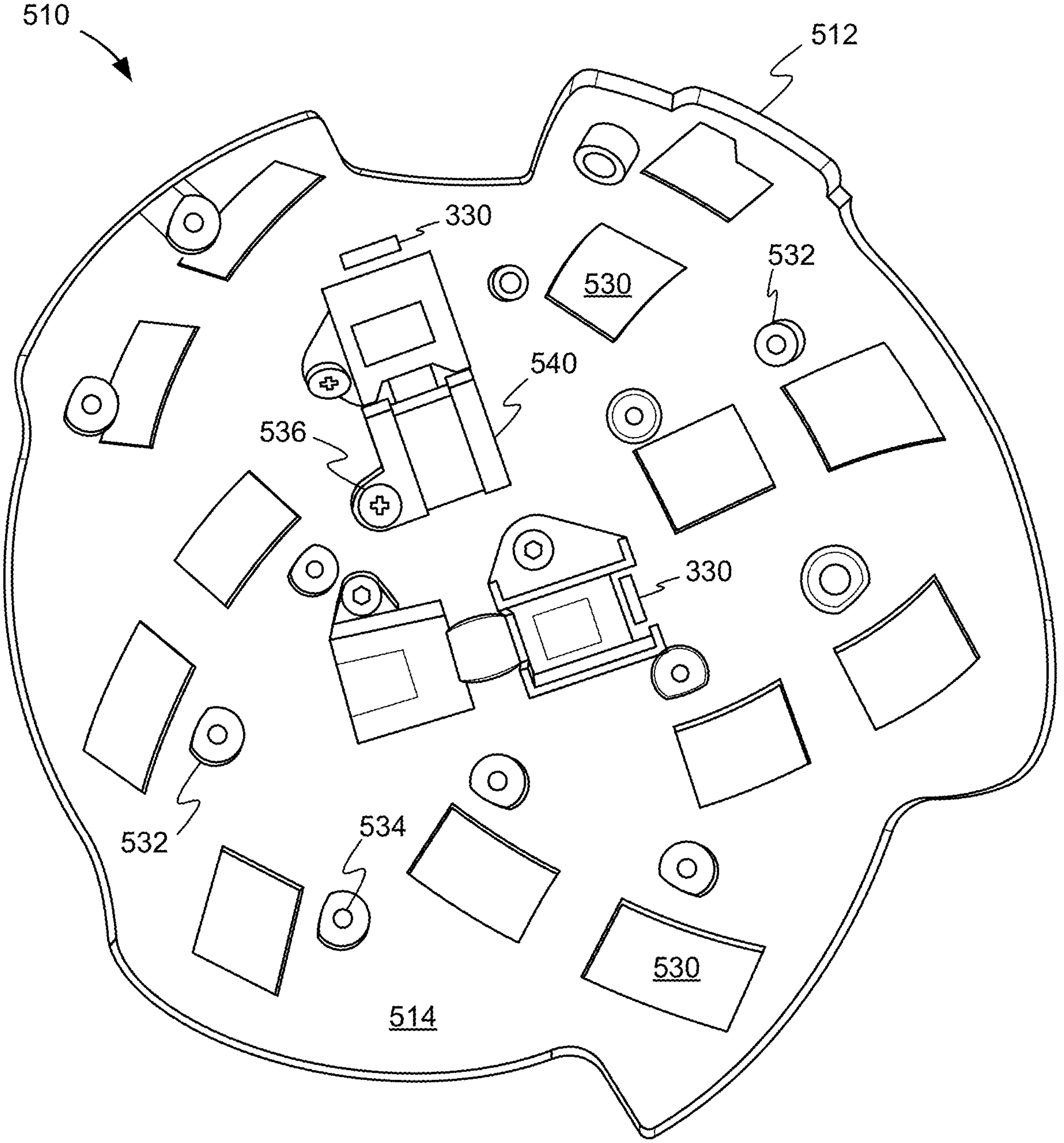
FIG. 5B is a simplified illustration of an inner surface of one of the halves of the inner spherical microphone body depicted in FIG. 5A according to some embodiments.

FIG. 5B is a simplified illustration of an inner surface 514 of inner sphere body half 510 depicted in FIG. 5A according to some embodiments. As shown in FIG. 5B, each of the microphone cutouts 530 in body half 510 can include a spacer post 532 adjacent to the cutout. Each spacer post 532 can extend outwardly away from inner surface 514 by a set distance and include a fastener hole 534 (e.g., a threaded hole) that enables a screw or similar fastener to be attached to the post. In some embodiments, the spacer posts 532 are extensions of the inner sphere half 510 and can be made from the same material from the same mold or other manufacturing process.

Microphone trays 540 (only four of which are shown in FIG. 5B) can be attached to each spacer post 532 to cover, protect and support microphones 520 that are placed within respective cutouts 530. While the microphone trays 540 provide support for microphones 520, the trays are positioned to allow each connector 330 of the microphone pairs to be accessed so that a cable with an appropriate mating connector can be coupled to the microphone pair to transmit data and power signals between the microphone pair and a power source and/or audio processing circuitry. In some embodiments, each microphone tray can be secured to its respective spacer post by a fastener 536 (e.g., a screw) that is attached to the fastener hole 534 of the spacer post.

While not shown in FIG. 5B, inner sphere body half 520 can have similar cutout, spacer and microphone tray features as those discussed with respect to body half 510. Also, while in some embodiments the microphones 220 need not be acoustically sealed with the body 210, the fit of each microphone (with its respective stiffener) within its respective cutout can be sufficiently close to make it look like the outer surface of body 210 is a fully sealed surface.

Figure 5C:
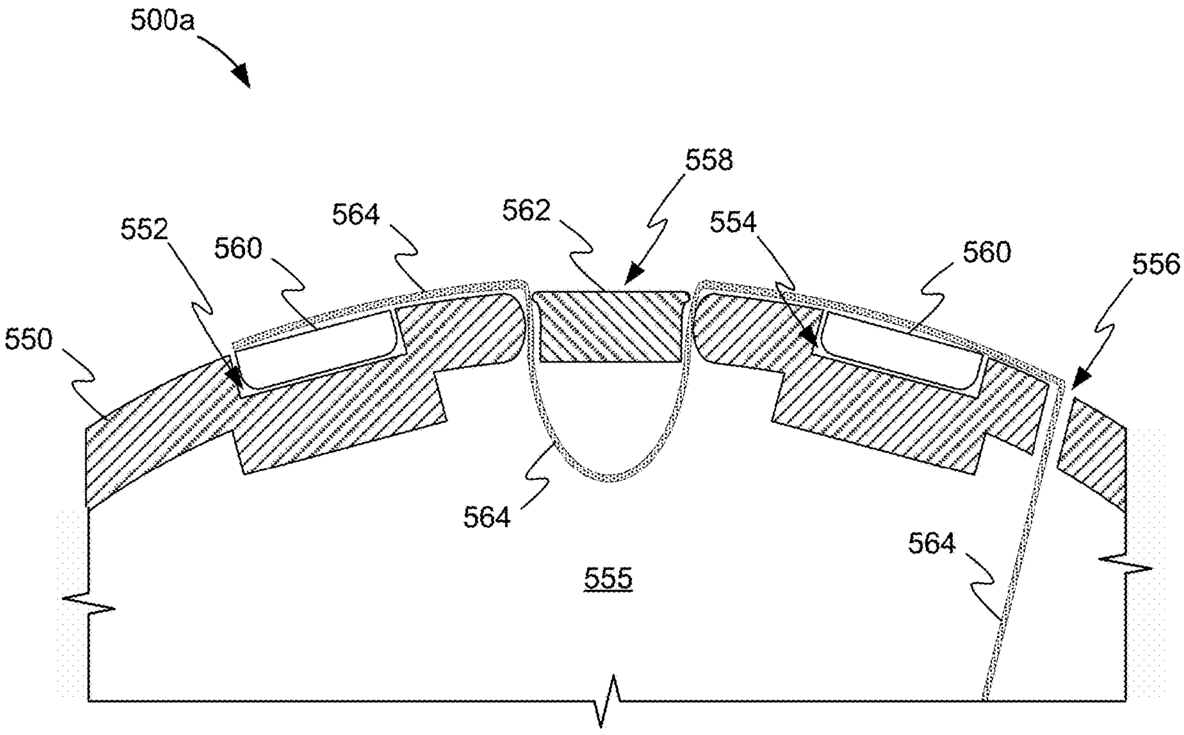
FIG. 5C which is a simplified cross-sectional illustration of a portion of an inner sphere according to some embodiments.

Rather than having cutouts 530 for each microphone as discussed above with respect to FIGS. 4A and 4B, in some embodiments, the inner sphere body includes pockets at its outer surface sized and shaped to hold each microphone. Pockets 552, 554 allow microphones 560 to be attached to outer wall 550 from outside the sphere 500*a* rather than from the inside. To illustrate, reference is made to FIG. 5C, which is a simplified cross-sectional illustration of a portion of an inner sphere 500*a* according to some embodiments. As shown, inner sphere 500*a* includes an outer wall 550 that includes multiple pairs of pockets 552, 554 formed therein. Each pocket 552, 554 can be a cavity formed in outer wall 550 that is sized and shaped to accept a microphone 560. Thus, in an embodiment in which there are forty-four microphones 560 distributed around a periphery of the inner sphere body 500*a* can include twenty two pairs of pockets 552, 554.

Microphones 560 can be attached to outer wall 550 using any appropriate method. For example, in some embodiments, the microphones 560 can be affixed to outer wall 550 with a mechanical fastener, such as a screw. In other embodiments, the microphones can be adhered to the outer wall 550 with an adhesive, such as a pressure sensitive adhesive (PSA), that secures the microphones in place in case of a drop or similar event, but allows the microphones to be removed and replaced if necessary. In some implementations, flex circuit 564 can include apertures (not shown in FIG. 5C) formed through the cable that are aligned with the microphone ports of microphones 560 to allow sound to reach the respective microphone.

A first aperture 556 can be formed through outer wall 550 adjacent to pocket 554 to enable a flex circuit 564, which can be similar to flex circuit 340 discussed above, to electrically couple each of the microphones 560 to signal processing circuitry as discussed above with respect to flex circuit 340. For example, flex circuit 564 can extend through aperture 556 into a central portion 555 of inner sphere 500*a*. The flex circuit can include a connector (not shown) at one end within central portion 555. The connector can then be connected, in turn, to signal writing that routes electrical signals including, for example, a voltage signal ($V_{DD}$), a Clock signal (CLK), a Data signal and Ground signal (GND), between the microphones 560 and processing circuitry.

In some embodiments, flex circuit 564 can follow, along its length, the curved contour of wall 550 between the two pockets 552, 554 before traversing through aperture 556 into interior of the inner sphere. As shown, an additional aperture 558 is formed through wall 550 between each of the pocket pairs 552, 554. Aperture 558 allows flex circuit 564 to be looped into the interior portion 555 of inner sphere 500*a* in order to provide a certain amount of tolerance to accommodate differences in distances between microphones 560 positioned in different pairs of pockets 552, 554 thereby ensuring that each flex circuit 564 can be properly aligned and coupled to each microphone 560 in its respective pair of microphones. A plug 562 can optionally be inserted into aperture 558 to better secure the flex circuit to the inner sphere. Plug 562 can be fabricated from any appropriate material. In some embodiments, plug 562 can be made from a relatively soft, flexible material, such as silicone or rubber, but in other embodiments the plug can be made from a relatively hard plastic material, similar to wall 550.

Outer Microphone Array

Figure 6:
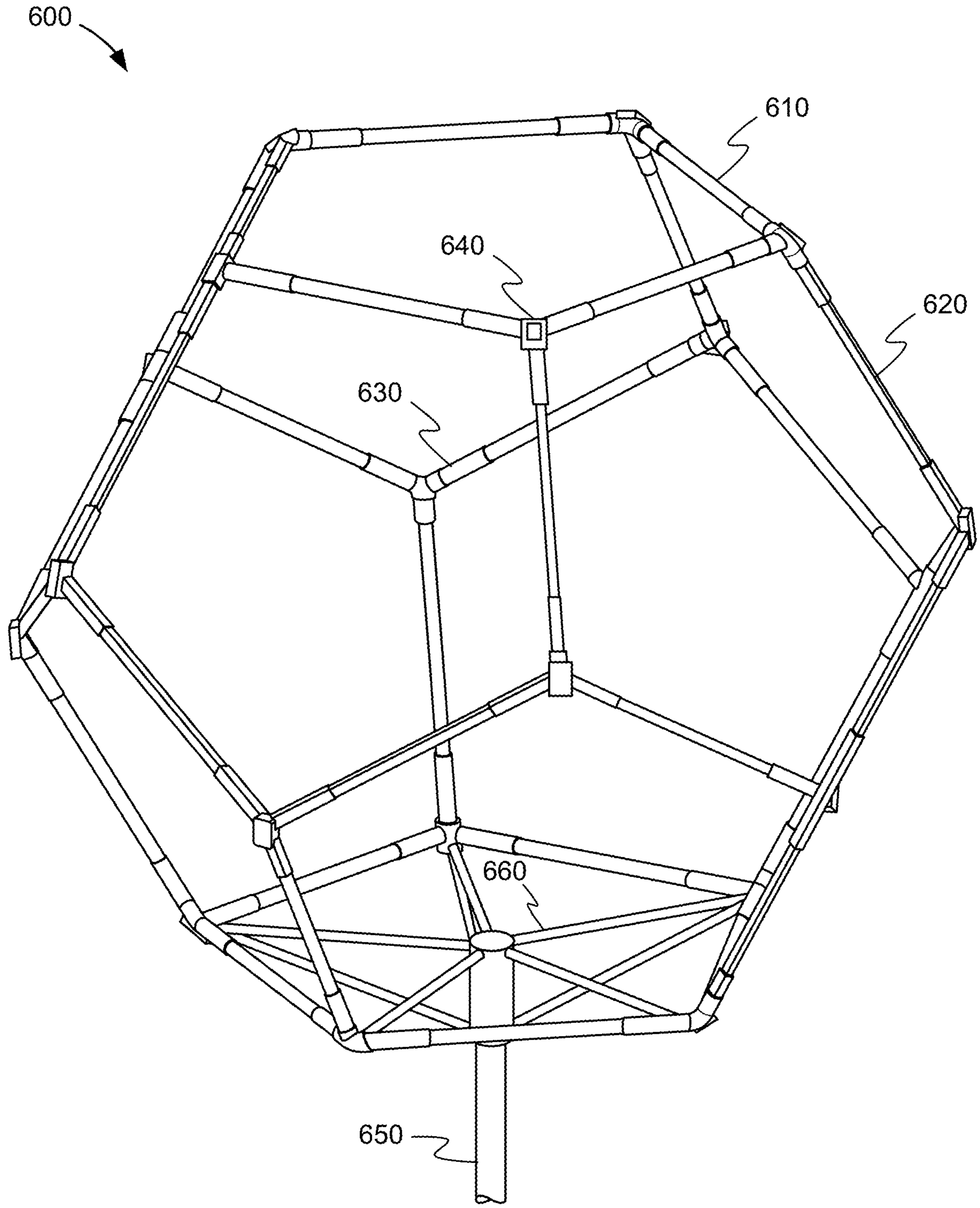
FIG. 6 is a simplified illustration of an outer dodecahedron body with an array of outer sphere microphones positioned at its vertices according to some embodiments.

FIG. 6 is a simplified illustration of an outer microphone sphere 600 (sometimes referred to herein as "outer sphere 600") according to some embodiments that can be representative of outer sphere 120 discussed above with respect to FIG. 1. Outer sphere 600 includes a regular dodecahedron body 610 that is an open structure that surrounds the inner sphere (e.g., inner sphere 110) and is designed to be transparent to sound fields. Dodecahedron body 610 can be formed by thirty different arms 620, each of which makes up an edge of the regular dodecahedron shape of body 610. Each arms 620 includes opposing first and second ends 622, 624 and can be made from any suitably strong and rigid material, such as plastic or metal. In some embodiments, each of arms 620 can be made a light weight, high strength and stiff material, such as titanium or aluminum.

Each of the arms 620 is connected with two other arms 620 at a joint structure 630 with the first end of each arm being connected to one joint structure 630 and the second end of each arm being connected to a second, different joint structure 630. The regular dodecahedron body 610 includes twenty joints 630 each of which supports an outer microphone 640 at one of the twenty vertices of regular dodecahedron body 610.

Figure 7A:
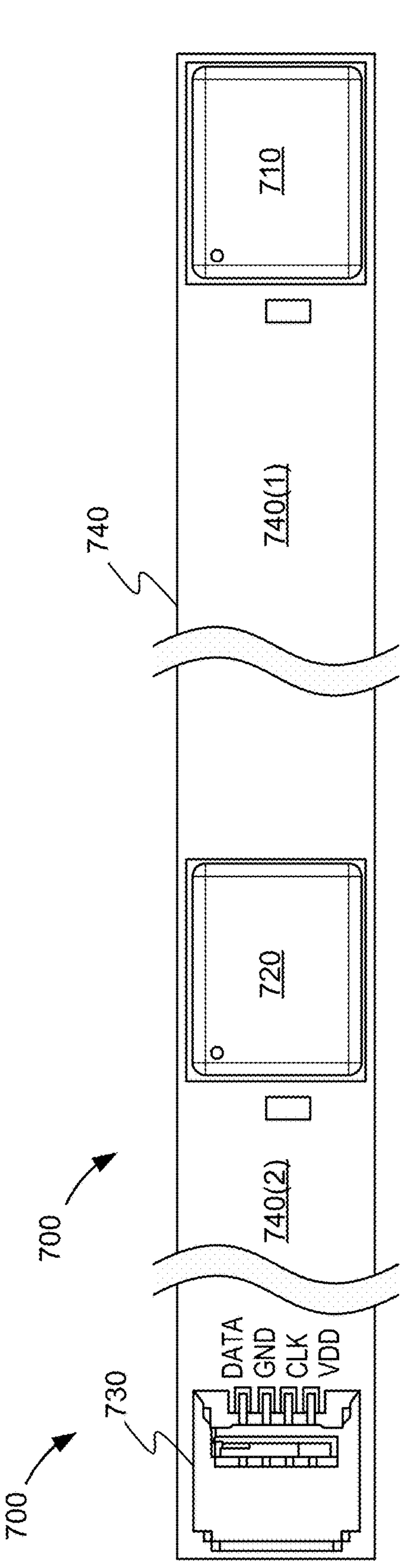
FIG. 7A is a simplified top plan view of a pair of MEMS microphones that can be arranged along the outer spherical microphone body shown in FIG. 6 according to some embodiments.
Figure 7B:
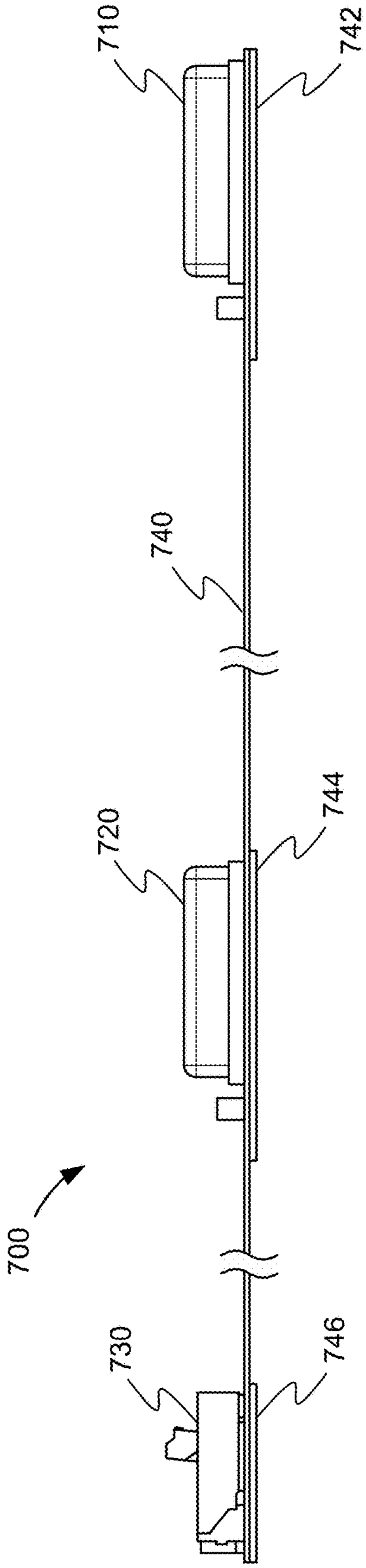
FIG. 7B is a simplified side view of the pair of MEMS microphones depicted in FIG. 7A according to some embodiments.

In some embodiments, the microphones incorporated into outer sphere 600 can be pairs of MEMS microphones similar to the MEMS microphones incorporated into the inner sphere. FIG. To illustrate, reference is made to FIGS. 7A and 7B. FIG. 7A is a simplified top plan view of a MEMS microphone pair 700 that can be used for the microphones attached to outer sphere 600. FIG. 7B is a simplified cross-sectional view of the pair of MEMS microphones 700 depicted in FIG. 3A. MEMS microphone pair 300 can be representative of each and every microphone pair mounted on outer sphere body 610. Thus, an embodiment that includes twenty microphones distributed around a periphery of the body 610 can include ten pairs of MEMS microphones 700.

Microphone pair 700 includes a first MEMS microphone 710, a second MEMS microphone 720, and a connector 730. Each of the MEMS microphones 710, 720 and the connector are mounted on a flex cable 740 that both supports and provides electrical interconnects to and from the components. For example, flex cable 740 includes traces that run a voltage signal ($V_{DD}$), a Clock signal (CLK), a Data signal and Ground (GND) between connector 740 and each of the two microphones 710, 720. Additionally, in some embodiments one or more discrete components 750 that function as filter to guarantee signal integrity can be operatively coupled to each MEMS microphone 710, 720 as described above with respect to discrete components 350.

In some embodiments, stiffeners 742, 744 and 746 can be attached to an underside of flex cable 740 to provide additional support for the mounted components. Flex cable 740 and each of the stiffeners 742 and 744 can have holes formed through them (not visible in FIGS. 7A or 7B) that are aligned with the microphone port of each microphone to allow sound to reach the respective microphone. Also, similar to microphones 310, 320, in some embodiments an acoustic mesh is disposed over the microphone port in each of microphones 710, 720. The acoustic mesh can be a fabric that protects against dust and debris from entering the microphone port and/or an acoustic membrane that protects against the ingress of moisture.

Each stiffener can be a thin (e.g., between 100-200 microns in some embodiments) rigid structure, rectangular in shape that has a footprint that is slightly larger than the component it supports. For example, stiffeners 742 and 744 can be slightly larger than the footprint of microphones 710 and 720, respectively, while stiffener 746 can be slightly larger than the footprint of connector 730.

Connector 730 provides an interface to the MEMS microphone pair 700 enabling transmission of the $V_{DD}$, a CLK, Data and GND signals over one or more signal wires that connect the microphones to a power supply and audio processing circuitry. To provide an idea on the scale of some embodiments, in one implementation where MEMS microphone pair 700 is representative of each of the microphone pairs in a dual-radius SMA in which the outer sphere has a radius of 12.6 cm, flex circuit 740 can be about 260 mm long.

Figure 8:
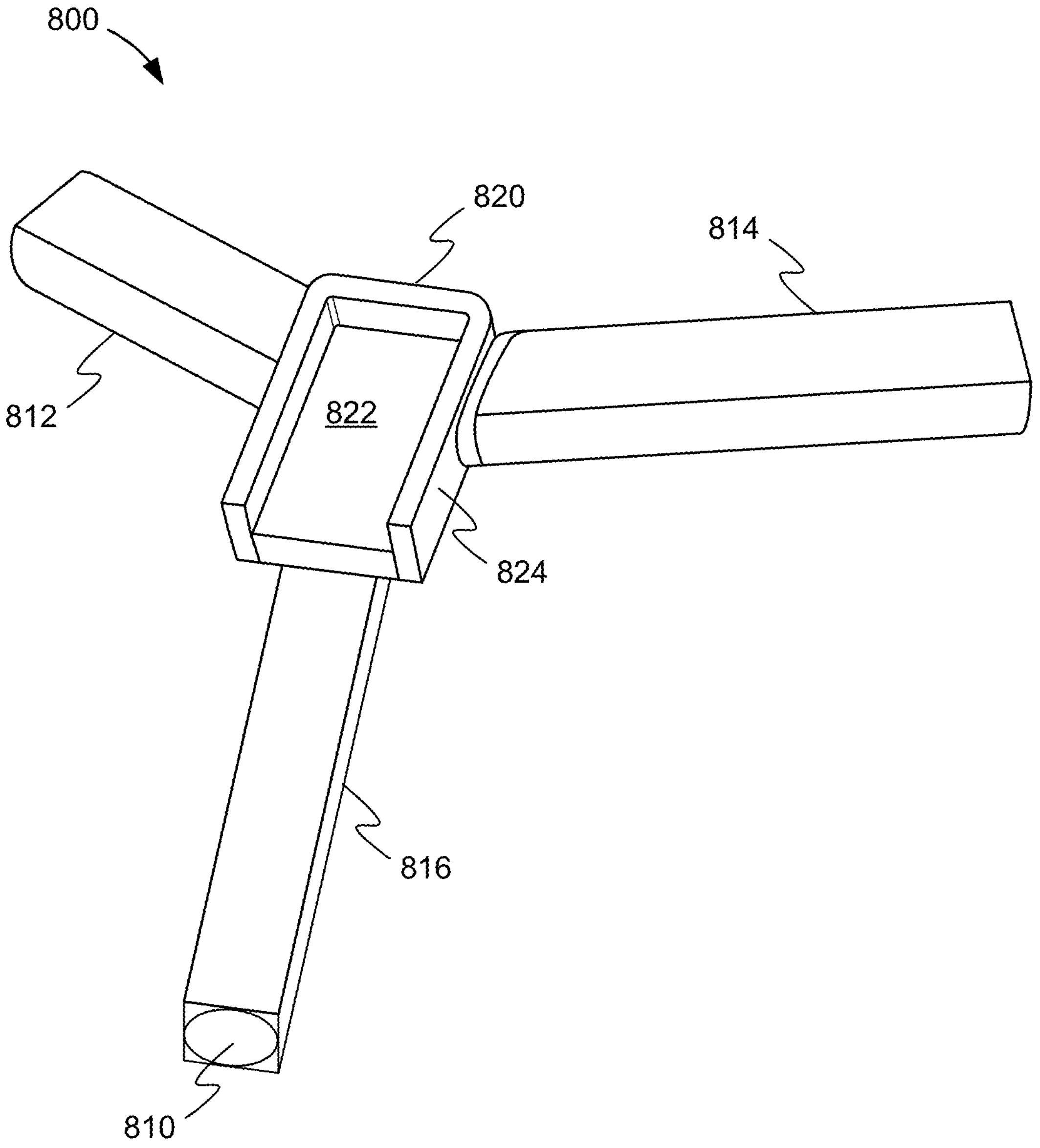
FIG. 8 is a simplified illustration of a joint structure that can form some of the vertices of the outer regular dodecahedron body shown in FIG. 6 according to some embodiments.

FIG. 8 is a simplified illustration of a joint structure 800 according to some embodiments. Joint structure 800 can be representative of joint structure 640 and can form various ones of the vertices 630, 640 of the outer regular dodecahedron body shown in FIG. 6. As shown, joint structure 800 includes three receptacle fingers 812, 814 and 816 that project outwardly away from a central microphone support bed 820. Each of the receptacle fingers 812, 814, 816 can include a receptacle opening 810 at its distal end that is sized and shaped to accommodate one of the first or second ends 622, 624 of arms 620. For example, an arm end from a first arm 620 can be inserted into receptacle opening 810 of finger 812, an arm end from a second arm 620 can be inserted into receptacle opening 810 of finger 814 and an arm end from a third arm 620 can be inserted into receptacle opening 810 of finger 816. In some embodiments, the first and second ends of each arm 620 can be fit within its respective receptacle opening 810 via an interference fit, and in some embodiments the arms can be bonded or otherwise affixed to the fingers using any appropriate technique (e.g., adhesive or chemical bonding).

Microphone support bed 820 is sized and shaped to support a microphone (not shown in FIG. 8), for example a MEMS microphone, at an outer vertex of the regular dodecahedron body 610 such that a microphone port of the microphone is positioned along a surface of the idealized imaginary sphere that is representative of outer sphere 600. The microphone can be secured to a flat support surface 822 between sidewalls 824. As depicted in FIG. 8, the sidewall 824 of microphone support bed 820 can include that extends along three sides of the support bed 822 where the sidewall 824 is configured to accept a MEMS microphone at the end of a MEMS microphone pairing (e.g., microphone 910 in FIG. 9). At some other vertices, the sidewall of a microphone support bed includes only two parallel legs allowing the flex circuit to pass into and out of the sides of the support bed without the sidewall as is useful for the other microphone in the pairing (e.g., microphone 920 of FIG. 9).

Referring back to FIG. 6, a mounting shaft 650 can be coupled to dodecahedron body 610 by a set of support struts 660. While not shown in FIG. 6, the mounting shaft 650 can extend further into the central area surrounded by body 610 and be mechanically attached to the inner sphere (e.g., inner sphere 200). Also, mounting shaft 650 can be a hollow tube or pipe-like structure that allows signal cables coupled to the outer and inner spheres to be routed through the mounting shaft to audio processing circuitry (not shown in FIG. 6). Both the mounting shaft 650 and support struts 660 can be rigid structures that support the dodecahedron body 610.

Figure 9:
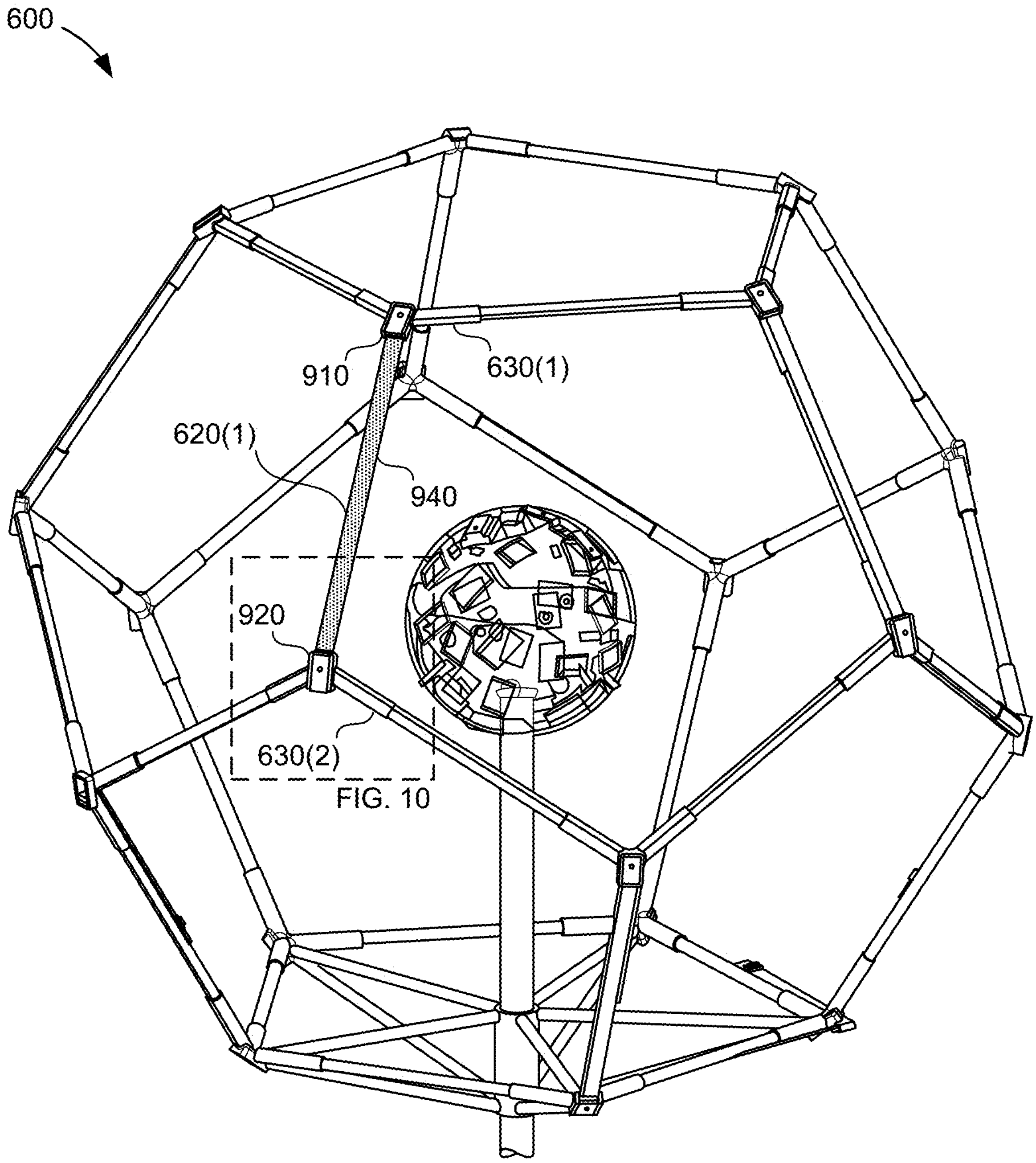
FIG. 9 is simplified illustration of an upper portion of a dual-radius spherical microphone array according to some embodiments.

Arms 620 serve multiple purposes including providing structure to dodecahedron body 610 and providing a path on which signal lines can be routed from the microphones in the second array to mounting shaft 650. In some embodiments, the signal lines can be routed via flex circuits (e.g., flex circuits 740 when MEMS microphones 700 are employed as the microphones) in the second microphone array (i.e., in the outer sphere). To illustrate, reference is made to FIG. 9, which is simplified diagram of an upper portion of the dual-radius spherical microphone 600 shown in FIG. 6. As shown in FIG. 9, dual-radius SMA 600 includes a first arm 620(1) coupled between first and second joint structures 630(1) and 630(2). A pair of MEMS microphones 910, 920 are mounted on the microphone mounting pads (not labeled) of their respective joint structures 630(1), 630(2) and a first portion of a flex circuit 940 (e.g., the portion 740(1) shown in FIG. 7A) runs along an outer facing edge of first arm 620(1).

Figure 10:
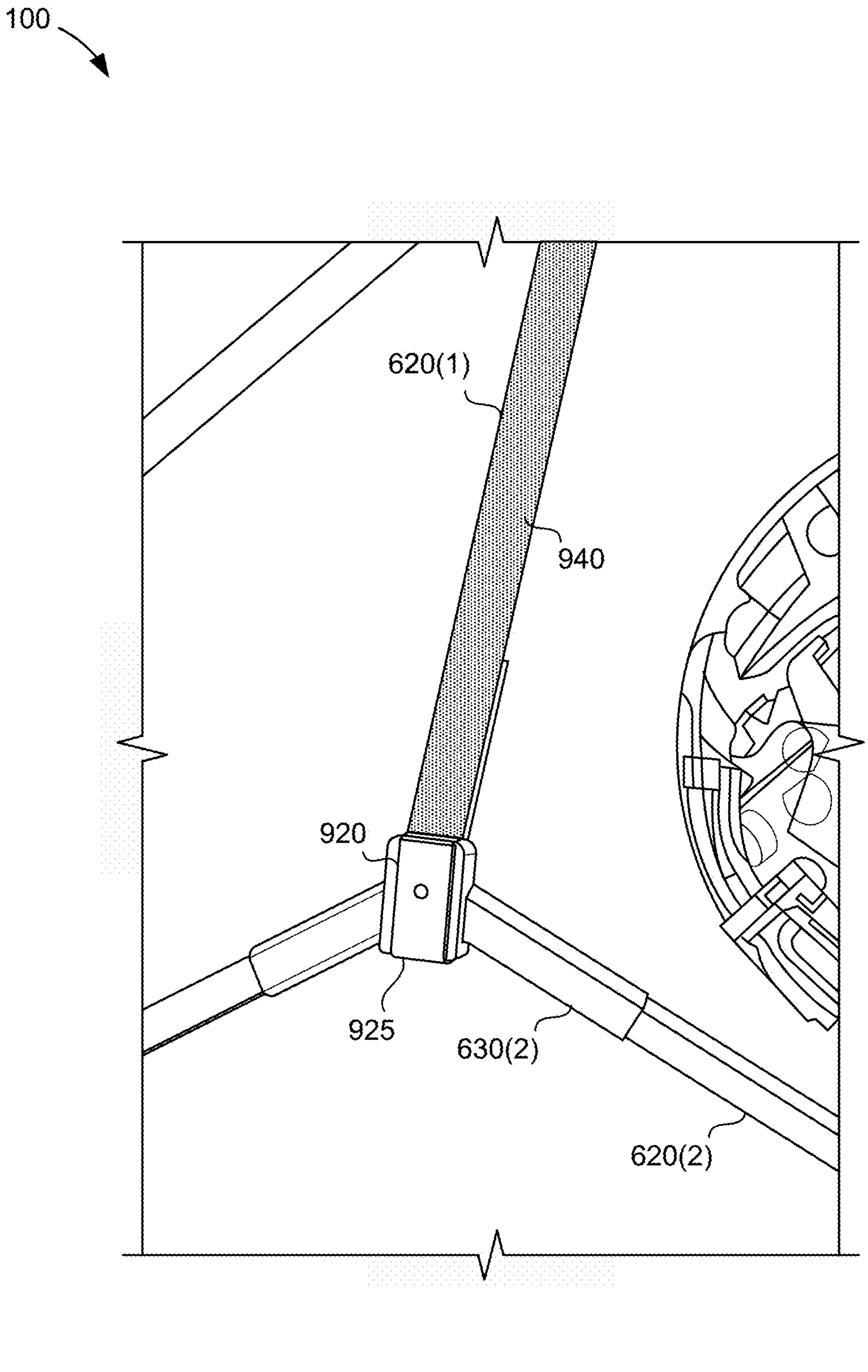
FIG. 10 is a simplified illustration depicting a MEMS microphone positioned at a vertex of the outer dodecahedron body depicted in FIG. 9 according to some embodiments.

As shown in FIG. 10, which is an expanded view of a portion of FIG. 9, a second portion of flex circuit 940 (e.g., the portion 740(2) shown in FIG. 7B) wraps around an outer edge 925 of joint structure 630(2) and, while not visible in either of FIG. 9 or 10, extends along an inside edge of arm 620(2) downwards towards the mounting shaft. Each of the ten microphone pairs can be mounted in a comparable manner to other joint structures and arms of outer body 610 such that all the various flex cables are routed toward the mounting shaft where they can be connected to the audio processor. FIG. 10 is a simplified illustration depicting a portion of a pair of outer body microphones according to some embodiments.

Figure 11A:
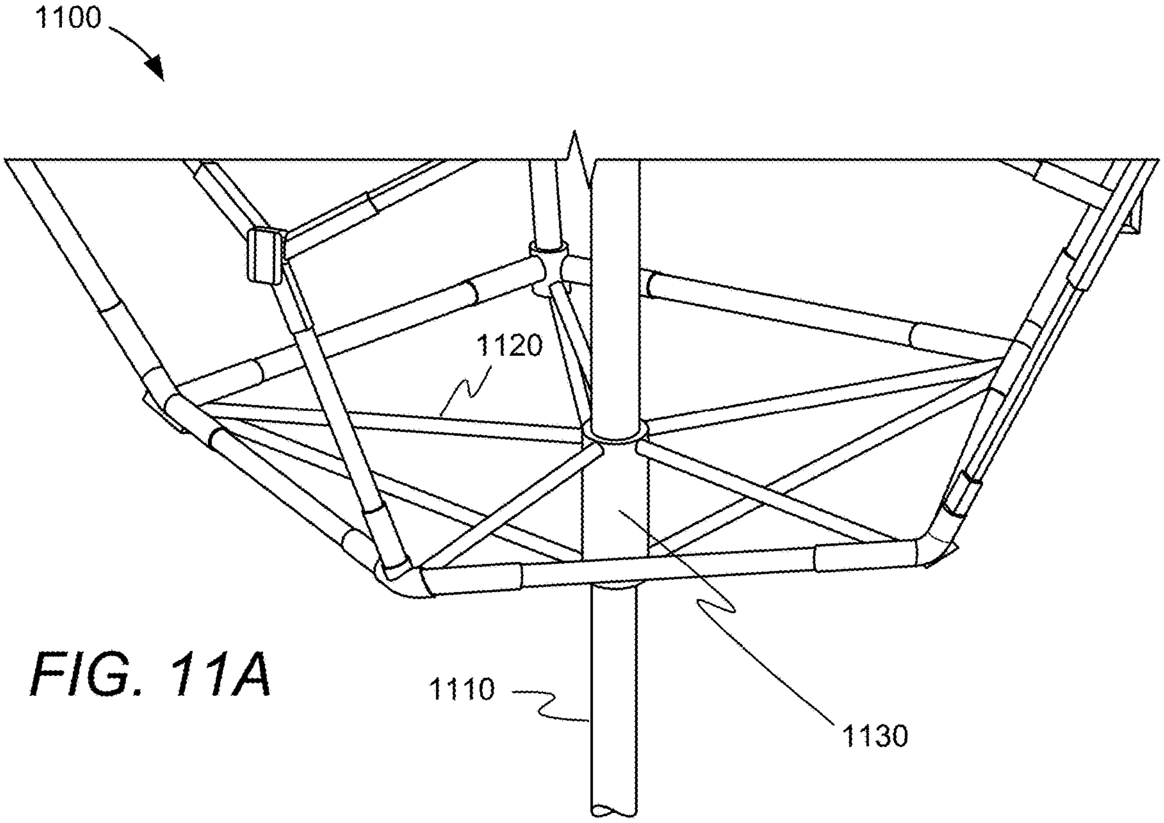
FIG. 11A is a simplified illustration of support struts that couple the outer dodecahedron body to the mounting shaft in accordance with some embodiments.

FIG. 11A is a simplified illustration of a bottom portion 1100 of multi-radius spherical microphone array in accordance with some embodiments. As shown, bottom portion 1100 includes a stem 1110 extending along a length of the mounting shaft and multiple support struts 1120. Stem 1110 can be representative of the mounting shafts discussed above including mounting shaft 130 and mounting shaft 650, while support struts 1120 can be representative of support struts 140, 660. While not shown in FIG. 11A, stem 1110 can be mechanically attached to the inner sphere using any appropriate technique. For example, in some embodiments a bottom portion of the inner sphere can include a cutout sized and shaped to accommodate a portion of stem 1110 extending into an interior cavity of the inner sphere. In other embodiments, stem 1110 can be directly attached to the bottom of the outer surface of the inner sphere.

As depicted in FIG. 11A, support struts 1120 can be coupled between the outer sphere and stem 1110 mechanically securing the outer sphere in a fixed relationship to stem 1110 and thus in a fixed relationship to the inner sphere. In the embodiment depicted, support struts 1120 are connected to a sleeve 1130 that can be slid over and attached to stem 1110 in any suitable manner. To provide a more secure attachment between the outer sphere and stem 1110, some of the support struts 1120 can be coupled to an upper portion of sleeve 1130 and some can be coupled to a lower portion of the sleeve 1130.

As discussed above, in various embodiments stem 1110 can be hollow to allow signal cables from the inner sphere to be routed directly through the stem (e.g., to an audio processor). In some embodiments, stem 1110 can also include openings (not shown) that allow signal cables from the outer sphere to be routed through the stem as well. It is to be understood the routing of signal cables within stem 1110 is optional, however, and in some embodiments signal cables from one or both of the inner and outer spheres can be run along an outer surface of the stem or not affixed to the stem at all.

Figure 11B:
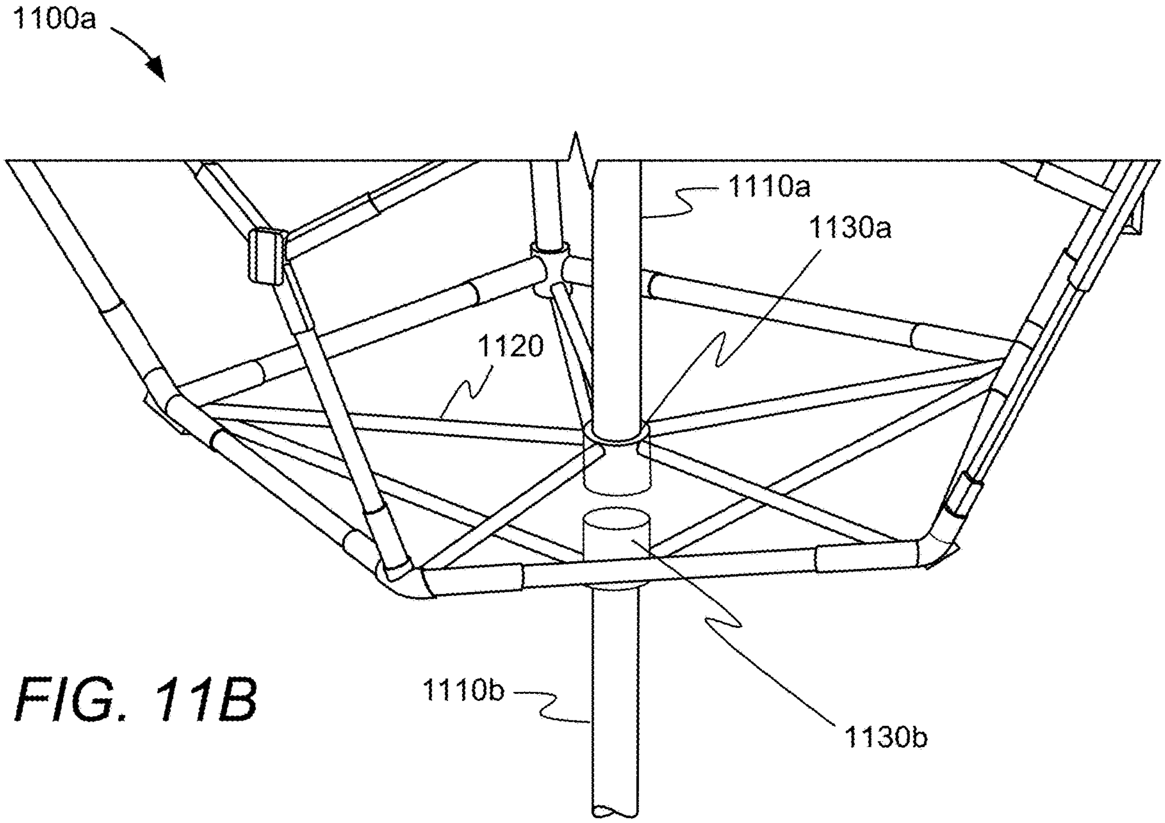
FIG. 11B is a simplified illustration of support struts that couple the outer dodecahedron body to the mounting shaft in accordance with additional embodiments.

FIG. 11B is a simplified illustration of a portion of a bottom portion 1100*a* of multi-radius spherical microphone array in accordance with additional embodiments. Bottom portion 1100*a* is similar to bottom portion 1100 except that sleeve 1130 includes two separate sleeve pieces: an upper portion 1130*a* and a lower portion 1130*b*. Additionally, stem 1110 can include two separate, hollow stem pieces: an upper stem 1110*a* and a lower stem 1110*b*. Stem 1110*a* can connect the inner sphere to the outer sphere while stem 1110*b* can connect the outer sphere to the audio processor housing. The sleeve pieces 1130*a,* 1130*b* are spaced apart from each other by a gap (not labeled) that allows signal cables to be fed into the stem 1110 at the gap instead of at the end of stem 1110.

In some embodiments, the dodecahedron body 610 of the outer microphone array can be 3D printed such that the body, including all of the arms and joints (e.g., arms 620, joints 630), the support struts (e.g., support struts 1120) and the sleeve (e.g., sleeve 1130), is a single, unitary structure. The unitary body can be printed such each arm of the dodecahedron is directly joined to two other arms at one of the vertices of the dodecahedron without requiring any connecting joints.

In one particular implementation, the dodecahedron body can be 3D printed from titanium resulting in a light weight, yet very strong body. The 3D printed body can include channels that run through the back of the arms to allow flex circuits that connect the various microphones disposed at each of the vertices of the dodecahedron body to be routed along the arms. The channels can both protect the flex cables and keep the cabling well organized. Additionally, each vertex of the 3D printed dodecahedron body can include a pocket that accepts its microphone. The pocket can be slightly deeper than the microphone allowing the microphone to be recessed within the pocket thereby protecting the microphone. In some implementations, one or more sides of the pocket can have opening aligned with the arm that enables a flex cable to be routed from the arm to the microphone.

Audio Processor Housing

Figure 12A:
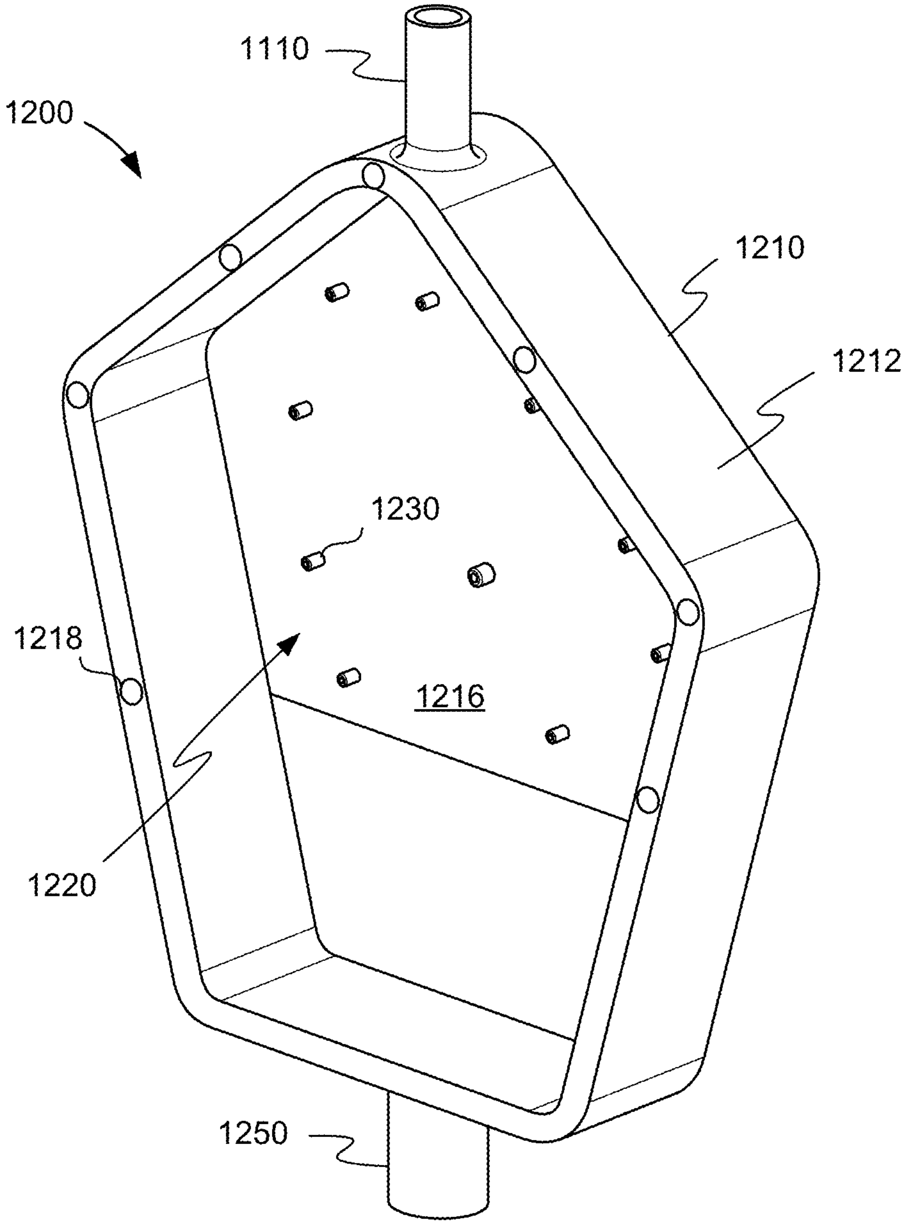
FIG. 12A is a simplified front perspective view of a microphone circuit board holder according to some embodiments.
Figure 12B:
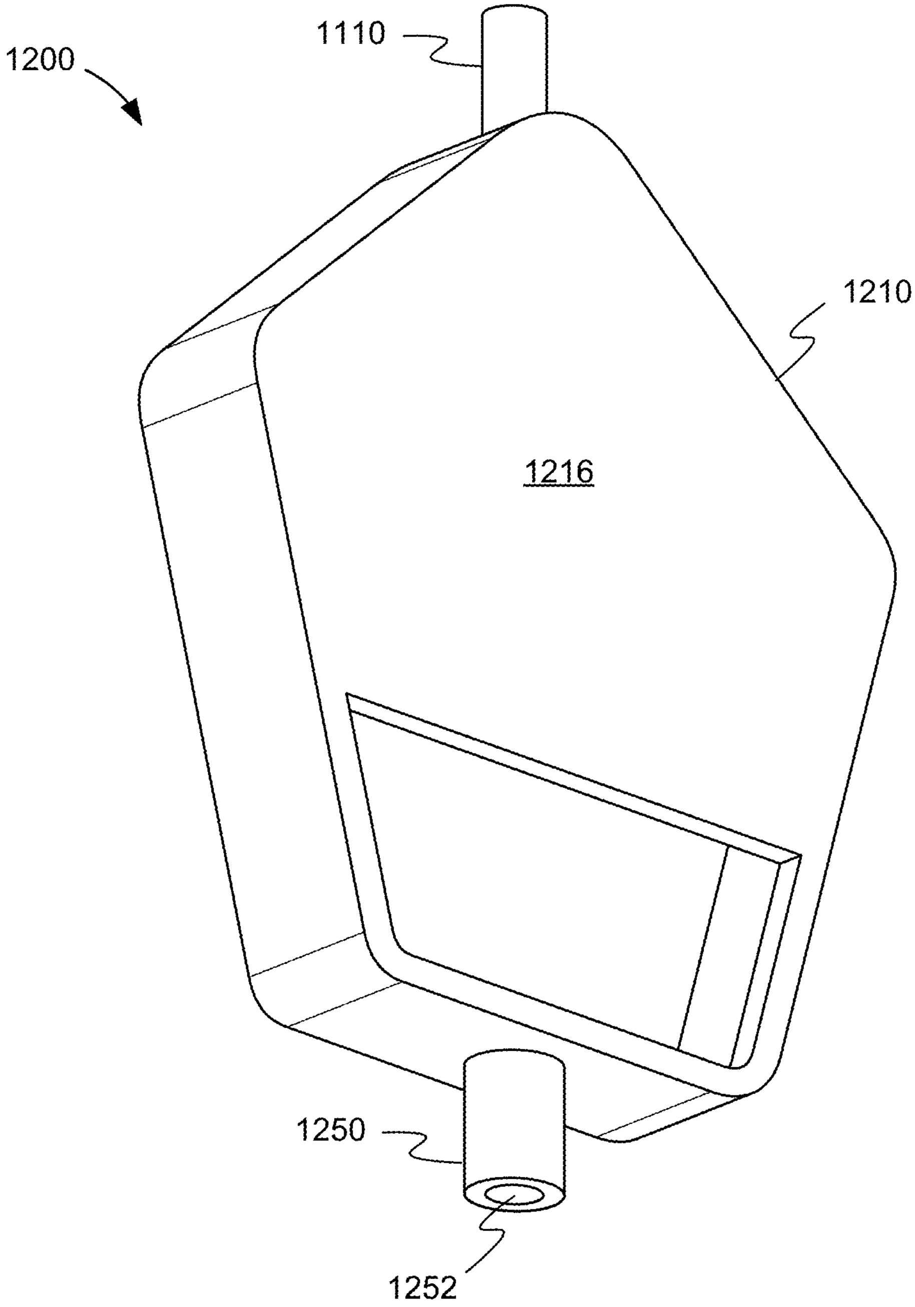
FIG. 12B is a simplified rear perspective view of the microphone circuit board holder shown in FIG. 12A according to some embodiments.

Audio signals from the microphones of the inner and outer spheres in a dual-sphere SMA according to embodiments described herein can be processed an audio processing system to recreate the sound field captured by the dual-sphere SMA. In some embodiments, the audio processing system can be formed on one or more circuit boards mounted within a housing that is directly attached to the mounting shaft. One such housing is shown in FIGS. 12A and 12B where are simplified front and rear perspective views of a microphone circuit board holder 1200 (referred to as "circuit board holder 1200") according to some embodiments. Circuit board holder can include a housing 1210 that has a sidewall 1212 extending around a periphery of the housing between a front wall (not shown in FIG. 12A in order to illustrate interior portions of housing 1210) and a back wall 1216. The front and back walls combine with sidewall 1212 to define an interior cavity 1220 in which one or more circuit boards can be housed. In some embodiments, the front wall can be removeably attached to sidewall 1212 by fasteners (not shown) at attachment points 1218.

Circuit boards (not shown) can be mounted within housing 1210 on, for example, spacers 1230. Audio processors and associated circuitry can be mounted to the circuit boards creating an audio processing system that can convert the signals received from the microphones of the dual-sphere SMA to an HOA signal that can deliver immersive sound as noted above in conjunction with FIG. 1. One or more electrical connectors can also be mounted on the circuits boards enabling power to be delivered to the audio processor circuitry and enabling audio and other signals to be exchanged between the audio processors and a separate, external computer system. Additionally, as shown in FIGS. 12A and 12B, a post 1250 or similar structure can extend away from a bottom portion of housing 1210. Post 1250 can include a threaded hole 1252 or similar attachment mechanism that allows housing 1210 to be secured to a microphone stand or similar structure that allows the entire dual-sphere SMA to be positioned at a desired location and desired height within an environment from which immersive sound can be captured.

Additional Embodiments

The foregoing description, for purposes of explanation, used specific nomenclature to provide a thorough understanding of the described embodiments. However, it will be apparent to one skilled in the art that the specific details are not required in order to practice the described embodiments. For example, while various examples of a SMA described above were in the context of dual-radius SMA, microphone arrays according to additional embodiments can include microphones arranged in more than two concentric spheres.

Thus, the foregoing descriptions of the specific embodiments described herein are presented for purposes of illustration and description. They are not target to be exhaustive or to limit the embodiments to the precise forms disclosed. Also, while different embodiments of the invention were disclosed above, the specific details of particular embodiments may be combined in any suitable manner without departing from the spirit and scope of embodiments of the invention. Further, it will be apparent to one of ordinary skill in the art that many modifications and variations are possible in view of the above teachings.

Finally, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A multi-radius spherical microphone array, comprising:

an inner body defining an inner sphere having an inner radius from a center;

a first plurality of microphones coupled to the inner body and defining an array of inner body microphones;

an outer body defining a regular dodecahedron, wherein the inner body and the outer body are concentric about the center;

a second plurality of microphones coupled to the outer body at respective vertices of the dodecahedron and defining an array of outer body microphones, wherein each microphone in the second plurality of microphones is positioned radially equidistant from the center;

a mounting shaft coupled with the inner body and extending outwardly through the outer body, wherein the mounting shaft includes a hollow stem extending along its length;

a sleeve positioned over a portion of a length of the hollow shaft; and a plurality of support struts coupling the outer body to the mounting shaft, wherein the plurality of support struts includes a first plurality of struts extending between an upper portion of the sleeve and the outer body and a second plurality of struts extending between a lower portion of the sleeve and the outer body.

2. The multi-radius spherical microphone array set forth in claim 1 wherein the outer body comprises a plurality of rigid arms that define thirty edges of the regular dodecahedron.

3. The multi-radius spherical microphone array set forth in claim 2 wherein the outer body is a unitary structure.

4. The multi-radius spherical microphone array set forth in claim 3 wherein the outer body is fabricated in a 3D printing process.

5. The multi-radius spherical microphone array set forth in claim 2 wherein:

the outer body further comprises a plurality of joint structures, one at each of the vertices of the regular dodecahedron;

each of the plurality of rigid arms is coupled between two separate joint structures in the plurality of joint structures; and each joint structure includes a surface for supporting one microphone in the array of outer body microphones.

6. The multi-radius spherical microphone array set forth in claim 1 further comprising a wind shield the fully surrounds the first and second pluralities of microphones.

7. The multi-radius spherical microphone array set forth in claim 1 wherein each microphone in the first plurality of microphones is positioned radially equidistant from the center.

8. The multi-radius spherical microphone array set forth in claim 1 wherein the microphones in the array of inner body microphones are evenly distributed across an outer surface of the inner spherical body.

9. A multi-radius spherical microphone array, comprising:

an inner body defining an inner sphere having an inner radius from a center;

a first plurality of microphones coupled to the inner body and defining an array of inner body microphones;

an outer body defining a regular dodecahedron, wherein the inner body and the outer body are concentric about the center; and a second plurality of microphones coupled to the outer body at respective vertices of the dodecahedron and defining an array of outer body microphones, wherein each microphone in the first plurality of microphones is a MEMS microphone that is part of a pair of MEMS microphones and wherein each microphone in the second plurality of microphones is positioned radially equidistant from the center and is a MEMS microphone that is part of a pair of MEMS microphones.

10. The multi-radius spherical microphone array set forth in claim 9 further comprising a mounting shaft coupled with the inner body and extending outwardly through the outer body.

11. The multi-radius spherical microphone set forth in claim 10 wherein the mounting shaft includes a hollow stem extending along its length.

12. The multi-radius spherical microphone array set forth in claim 11 further comprising a plurality of support struts coupling the outer body to the mounting shaft.

13. The multi-radius spherical microphone array set forth in claim 12 further comprising a sleeve positioned over a portion of a length of the hollow stem and wherein the plurality of support struts include a first plurality of struts extending between an upper portion of the sleeve and the outer body and a second plurality of struts extending between a lower portion of the sleeve and the outer body.

14. A multi-radius spherical microphone array, comprising:

an inner spherical body comprising a rigid shell extending around a center of the spherical body and defining an interior cavity;

a first array of microphones coupled to and evenly distributed across an outer surface of the inner spherical body;

an outer body defining a regular dodecahedron surrounding and concentric with the inner spherical body, wherein the outer body comprises an open frame having thirty arms aligned along edges of the regular dodecahedron that connect with each other at vertices of the regular dodecahedron; and a second array of microphones coupled to the outer body at respective vertices of the regular dodecahedron; and a mounting shaft coupled with the inner spherical body and extending outwardly through the outer body;

a sleeve positioned over a portion of a length of the mounting shaft; and a plurality of support struts coupling the outer body to the mounting shaft, wherein the plurality of support struts includes a first plurality of struts extending between an upper portion of the sleeve and the outer body and a second plurality of struts extending between a lower portion of the sleeve and the outer body.

15. The multi-radius spherical microphone array set forth in claim 14 wherein each microphone in the first array of microphones includes a microphone port positioned at a surface of an idealized imaginary sphere representative of an inner sphere of the multi-radius spherical microphone array and each microphone in the second array of microphones includes a microphone port positioned at a surface of an idealized imaginary sphere representative of an outer sphere of the multi-radius spherical microphone array.

16. The multi-radius spherical microphone array set forth in claim 14 wherein the mounting shaft includes a hollow stem extending along its length and wherein each microphone in the first array of microphones is coupled to a signal cable that extends out of the inner spherical body into the hollow shaft.

17. The multi-radius spherical microphone array set forth in claim 14 wherein the outer body is a single, unitary structure.

* * * * *